(12) United States Patent
Schiffmann et al.

(10) Patent No.: US 8,272,190 B2
(45) Date of Patent: Sep. 25, 2012

(54) METHOD OF FABRICATING BUILDING WALL PANELS

(75) Inventors: Gerhard P. Schiffmann, St. Germain, WI (US); Glenn P. Schiffmann, St. Germain, WI (US)

(73) Assignee: Composite Panel Systems, LLC, Eagle River, WI (US)

( * ) Notice: Subject to any disclaimer, the term of this patent is extended or adjusted under 35 U.S.C. 154(b) by 0 days.

(21) Appl. No.: 12/317,164

(22) Filed: Dec. 18, 2008

(65) Prior Publication Data
US 2009/0165411 A1    Jul. 2, 2009

Related U.S. Application Data

(63) Continuation-in-part of application No. 11/901,174, filed on Sep. 13, 2007, now Pat. No. 7,926,241, and a continuation-in-part of application No. 11/901,057, filed on Sep. 13, 2007, now Pat. No. 8,082,711, application No. 12/317,164, which is a continuation-in-part of application No. 11/900,987, filed on Sep. 13, 2007, now Pat. No. 7,926,233, and a continuation-in-part of application No. 11/900,998, filed on Sep. 13, 2007, now Pat. No. 7,930,861, and a continuation-in-part of application No. 11/901,059, filed on Sep. 13, 2007, now Pat. No. 7,905,067, and a continuation-in-part of application No. 11/901,173, filed on Sep. 13, 2007, now Pat. No. 8,012,301, and a continuation-in-part of application No. 11/901,175, filed on Sep. 13, 2007.

(60) Provisional application No. 61/008,379, filed on Dec. 19, 2007, provisional application No. 60/923,822, filed on Apr. 16, 2007, provisional application No. 60/876,403, filed on Dec. 21, 2006, provisional application No. 60/872,929, filed on Dec. 4, 2006.

(51) Int. Cl.
*E04C 2/34* (2006.01)

(52) U.S. Cl. ........ 52/793.1; 52/293.1; 52/270; 52/309.9

(58) Field of Classification Search .............. 52/169.5, 52/267, 269, 270, 265, 264, 262, 293.1, 169.1, 52/309.9, 309.11, 782.1, 794.1, 793.1, 309.7, 52/309.16, 289, 299, 296, 232
See application file for complete search history.

(56) References Cited

U.S. PATENT DOCUMENTS
584,865 A    6/1897    Fisher
(Continued)

FOREIGN PATENT DOCUMENTS
FR    2719065    10/1995
(Continued)

OTHER PUBLICATIONS

Joseph E. Sumerak and Jeffrey D. Martin, Pultrusion, XP-002539483, No. 550-564, 15 pages.

(Continued)

*Primary Examiner* — Robert Canfield
*Assistant Examiner* — Babajide Demuren
(74) *Attorney, Agent, or Firm* — Thomas D. Wilhelm; Wilhelm Law, S.C.

(57) ABSTRACT

Methods of fabricating wall panels by generally continuously pultruding a wall panel profile comprising inner and outer layers, and spaced reinforcing webs and/or foam extending between the inner and outer layers, optionally studs extending inwardly from the inner layer, away from the outer layer. The so-continuously pultruded wall panel optionally has male and a female edges. The wall panel is periodically cut for wall panel height, thereby creating an ongoing stream of cut wall panels. The panels are advanced through a corner index station, and indexed at right angles while maintaining orientation of the panels. The wall panels leave the indexing station edge-to-edge. Resin is applied to facing edges of adjacent wall panels. Adjacent wall panels are joined to each other at the facing edges, to make a generally continuous wall panel. The so-joined wall panel is cut to desired lengths. The resulting wall panel can provide tough, water-proof, otherwise weather-proof, building systems and buildings, without structural use of concrete except in floor slabs.

16 Claims, 22 Drawing Sheets

U.S. PATENT DOCUMENTS

| | | | |
|---|---|---|---|
| 1,156,753 | A | 10/1915 | Carey |
| 1,858,701 | A | 5/1932 | Boettcher |
| 2,074,483 | A | 3/1937 | Mason et al. |
| 2,204,319 | A | 6/1940 | Parsons et al. |
| 2,737,227 | A | 3/1956 | Brummel |
| 2,915,150 | A | 12/1959 | Weidler |
| 2,947,119 | A | 8/1960 | Puckett, Jr. |
| 2,950,786 | A | 8/1960 | Markle |
| 3,107,755 | A | 10/1963 | Thibert |
| 3,216,163 | A | 11/1965 | Carew |
| 3,258,889 | A | 7/1966 | Butcher |
| 3,339,326 | A | 9/1967 | Derr et al. |
| 3,386,218 | A | 6/1968 | Scott |
| 3,479,784 | A | 11/1969 | Massagli |
| 3,480,497 | A | 11/1969 | Morse et al. |
| 3,544,417 | A * | 12/1970 | Corzine ................. 428/104 |
| 3,545,214 | A | 12/1970 | Grazel |
| 3,573,144 | A | 3/1971 | Andersen |
| 3,579,937 | A | 5/1971 | Lukens |
| 3,601,942 | A | 8/1971 | Wilson |
| 3,685,241 | A | 8/1972 | Cooper |
| 3,719,016 | A | 3/1973 | Randolph |
| 3,790,115 | A | 2/1974 | Fox et al. |
| 3,898,115 | A | 8/1975 | Watkins et al. |
| 4,038,796 | A | 8/1977 | Eckel |
| 4,078,348 | A | 3/1978 | Rothman |
| 4,083,159 | A | 4/1978 | Hatch et al. |
| 4,125,980 | A | 11/1978 | Miraldi |
| 4,205,408 | A | 6/1980 | Glass et al. |
| 4,223,053 | A | 9/1980 | Brogan |
| 4,229,919 | A | 10/1980 | Hughes |
| 4,310,992 | A | 1/1982 | Thabet |
| 4,313,688 | A | 2/1982 | Daniels |
| 4,343,669 | A | 8/1982 | Prior |
| 4,439,959 | A | 4/1984 | Helfman |
| 4,463,043 | A | 7/1984 | Reeves et al. |
| 4,463,531 | A | 8/1984 | Peretto |
| 4,464,873 | A | 8/1984 | Geiger |
| 4,471,591 | A | 9/1984 | Jamison |
| 4,569,167 | A | 2/1986 | Staples |
| 4,580,487 | A | 4/1986 | Sosnowski |
| 4,653,239 | A | 3/1987 | Randa |
| 4,660,799 | A | 4/1987 | Butland |
| 4,726,707 | A | 2/1988 | Newton |
| 4,738,061 | A | 4/1988 | Herndon |
| 4,783,935 | A | 11/1988 | Creager |
| 4,833,842 | A | 5/1989 | Anastasio |
| 4,833,855 | A | 5/1989 | Winter, IV |
| 4,860,508 | A | 8/1989 | Jackson et al. |
| 4,909,009 | A | 3/1990 | Ogawa et al. |
| 4,963,408 | A | 10/1990 | Huegli |
| 4,984,406 | A | 1/1991 | Friesen |
| 5,037,498 | A | 8/1991 | Umeda |
| 5,059,377 | A | 10/1991 | Ashton et al. |
| 5,061,542 | A | 10/1991 | Brace |
| 5,069,737 | A | 12/1991 | Guiton |
| 5,242,652 | A | 9/1993 | Savigny |
| 5,279,089 | A | 1/1994 | Gulur |
| 5,286,320 | A | 2/1994 | McGrath et al. |
| 5,359,816 | A | 11/1994 | Iacouides |
| 5,382,148 | A | 1/1995 | Buckley |
| 5,403,062 | A | 4/1995 | Sjostedt et al. |
| 5,403,063 | A | 4/1995 | Sjostedt et al. |
| 5,509,242 | A | 4/1996 | Rechsteiner et al. |
| 5,547,737 | A | 8/1996 | Evans et al. |
| 5,572,841 | A | 11/1996 | Buster |
| 5,589,243 | A | 12/1996 | Day |
| 5,657,597 | A | 8/1997 | Loftus |
| 5,664,518 | A | 9/1997 | Lewit et al. |
| 5,707,576 | A | 1/1998 | Asher |
| 5,735,090 | A | 4/1998 | Papke |
| 5,743,056 | A | 4/1998 | Balla-Goddard et al. |
| 5,761,862 | A | 6/1998 | Hendershot et al. |
| 5,834,082 | A | 11/1998 | Day |
| 5,857,297 | A | 1/1999 | Sawyer |
| 5,881,519 | A | 3/1999 | Newkirk |
| 5,890,334 | A | 4/1999 | Hughes, Jr. |
| 5,927,032 | A | 7/1999 | Record |
| 5,953,883 | A | 9/1999 | Ojala |
| 5,979,684 | A * | 11/1999 | Ohnishi et al. ................. 220/1.5 |
| 5,996,296 | A | 12/1999 | Bisbee |
| 6,041,562 | A | 3/2000 | Martella et al. |
| 6,082,066 | A | 7/2000 | Mill |
| 6,125,597 | A | 10/2000 | Hoffman et al. |
| 6,131,365 | A | 10/2000 | Crockett |
| 6,164,035 | A | 12/2000 | Roberts |
| 6,205,720 | B1 | 3/2001 | Wolfrum |
| 6,205,729 | B1 | 3/2001 | Porter |
| 6,244,005 | B1 | 6/2001 | Wallin |
| 6,256,960 | B1 | 7/2001 | Babcock et al. |
| 6,381,793 | B2 | 5/2002 | Doyle et al. |
| 6,408,594 | B1 | 6/2002 | Porter |
| 6,410,118 | B1 | 6/2002 | Reicherts et al. |
| 6,418,686 | B1 | 7/2002 | Record |
| 6,467,118 | B2 | 10/2002 | Dumlao et al. |
| 6,481,172 | B1 | 11/2002 | Porter |
| 6,484,460 | B2 | 11/2002 | VanHaitsma |
| 6,615,559 | B2 | 9/2003 | McGrath et al. |
| 6,670,291 | B1 | 12/2003 | Tompkins et al. |
| 6,740,381 | B2 | 5/2004 | Day et al. |
| 6,755,003 | B1 | 6/2004 | McGrath et al. |
| 6,755,633 | B2 | 6/2004 | Miller |
| 6,799,403 | B2 | 10/2004 | Winter |
| 6,848,228 | B1 | 2/2005 | Williams |
| 6,854,499 | B2 | 2/2005 | Miller |
| 7,052,563 | B2 | 5/2006 | Dong et al. |
| 2001/0031350 | A1* | 10/2001 | Day et al. ................. 428/317.9 |
| 2002/0014302 | A1 | 2/2002 | Fanucci et al. |
| 2002/0062607 | A1 | 5/2002 | Hota et al. |
| 2002/0069600 | A1 | 6/2002 | Bryant |
| 2002/0122954 | A1 | 9/2002 | Dagher |
| 2004/0050001 | A1 | 3/2004 | Williams |
| 2004/0134162 | A1* | 7/2004 | Douglas ................. 52/741.1 |
| 2005/0118369 | A1 | 6/2005 | Kennedy |
| 2005/0138891 | A1 | 6/2005 | Wool et al. |
| 2006/0096204 | A1 | 5/2006 | Martens et al. |
| 2006/0150550 | A1 | 7/2006 | Summers |
| 2006/0254167 | A1 | 11/2006 | Antonic |
| 2007/0051059 | A1 | 3/2007 | Ahearn |
| 2007/0074469 | A1 | 4/2007 | Plagemann et al. |
| 2007/0125042 | A1 | 6/2007 | Hughes et al. |
| 2008/0104909 | A1 | 5/2008 | Wallin |

FOREIGN PATENT DOCUMENTS

| | | |
|---|---|---|
| GB | 2115452 | 8/1983 |
| WO | WO 2005/067545 | 7/2005 |
| WO | WO 2006/019478 | 2/2006 |
| WO | 2008070026 | 6/2008 |

OTHER PUBLICATIONS

Unknown Author, Superior Walls Xi Foundation System, www.superiorwalls.com/images/XiWall_lg.jpeg, Printed May 2, 2005, 1 page.

Unknown Author, Superior Walls R-5 System, www.superioiwalls.com/images/R5_lg.jpeg, Printed May 2, 2005, 1 page.

Owens Corning, Fold-Form Insulating Concrete Forms, brochure, Dated 2004, 6 pages.

ICF Direct Incorporated, Performance, Quality, Unmatched Value Insulated Concrete Forms, brochure, 4 pages.

Portland Cement Association (PCA), Insulating Concrete Form Assocation (ICFA) and Concrete Homes, Beautiful Homes Built to Last, brochure, 14 pages, Published by ICFA and PCA.

Lite-Form Technologies, The Beautiful Difference in Concrete begins with Lite-Form, brochure, Copyrighted 2004, 8 pages, Published by Lite-Form Technologies, South Sioux City, NE.

Lite-Form Technologies, Make Your Own ICFs (Insulated Concrete Forms) and Get Everything You Need From One Company, brochure, 3 pages.

Reward Wall Systems, No One Builds Benefits Like Reward, mailed brochure, Copyrighted 2005, 8 pages, Published by Reward Walls Systems, Inc., Printed in the USA.

Home Energy, Choosing a Basement Wall System, hem.dis.anl.gov/eehem/99/990311.html, Online Magazine, Dated Mar./Apr. 1999, 7 pages, Published by Home Energy.

Bigfoot Systems, Build It With Bigfoot, advertisement, 1 page.

Clear Corporation, The SIP System with a Concrete Difference, www.buildingsystems.com, magazine, Dated Jan./Feb. 2005, 6 pages.

National Research Council Canada, As Composite Inc., brochure, 2 pages.

National Research Council Canada, As Composite Building Sandwich Panels, Technical Sheet, Dated Oct. 2006, 3 pages.

Unknown Author, Why Tecton Pultrusions?, part of brochure, 1 page.

AVTEC Industries, Fire Retardant Technology, TSWB Fire Retardant Additive, brochure, 1 page.

AVTEC Industries, Inc., MSDS (Material Safety Data Sheet), TSWB Product Properties, 3 pages.

AVTEC Industries, Fire Retardant Technology, Unequaled Technology Unsurpassed Performance, Power Point Slides, 20 pages.

ENGINEERSHANDBOOK.COM, Manufacturing Processes—Vacuum Bag Molding, Composite Molding Processes, Engineer's Handbook, Copyright 2004-2006, printed Apr. 21, 2010, www.web.archive.org/web/20060516141840/http://engineershandbook.com/MfgMethods/vacuumbagmolding.htm.

\* cited by examiner

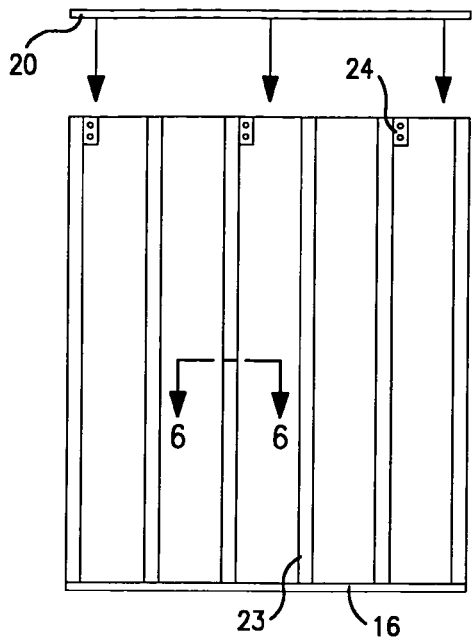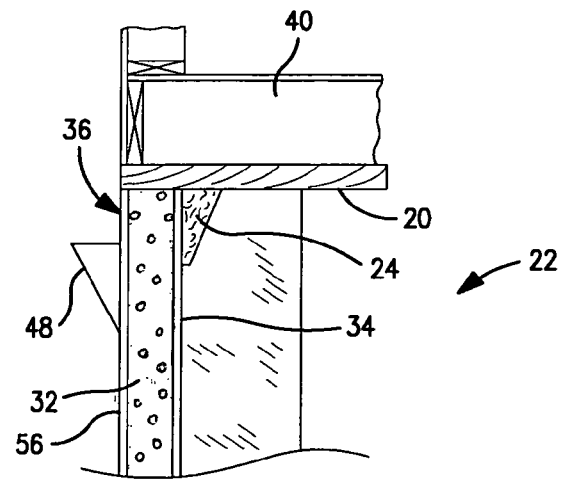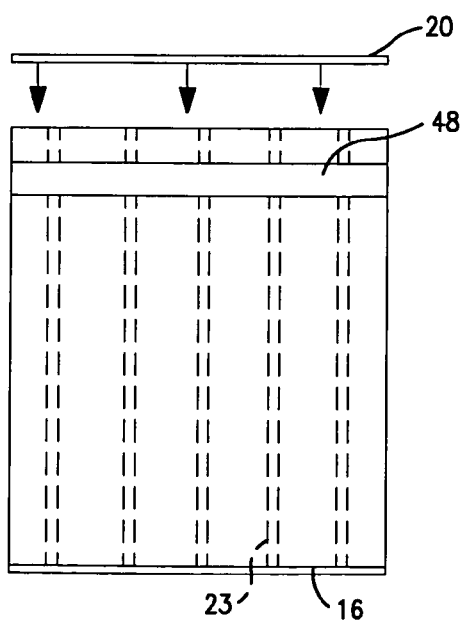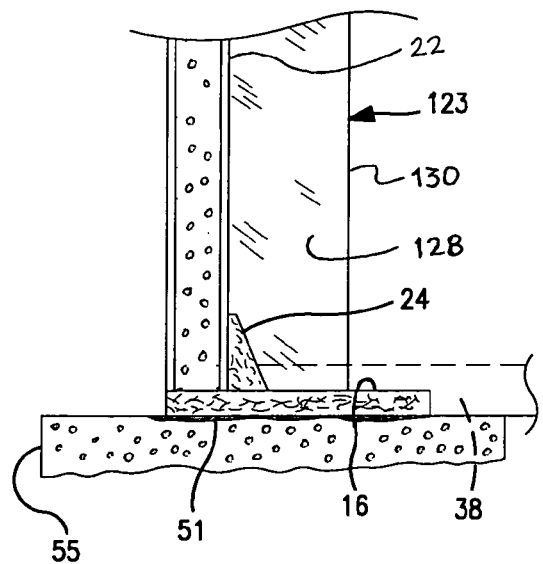
FIG. 2
FIG. 3
FIG. 4

| Wall Height, H(ft) | Maximum Unbalanced Backfill Height (ft) | Maximum Lateral Pressure on Wall, W(psf)/Kg/m² Soil Classes | | |
|---|---|---|---|---|
| | | GW, GP, SE and SP | GM, GC, SM-SC and ML | SC, MH, ML-CL and Inorganic CL |
| 7 | 4 | 120/586 | 180/878 | 240/1171 |
| | 5 | 150/732 | 225/1098 | 300/1464 |
| | 6 | 180/878 | 270/1317 | 360/1756 |
| | 7 | 210/1025 | 315/1537 | 420/2049 |
| 8 | 4 | 120/586 | 180/878 | 240/1171 |
| | 5 | 150/732 | 225/1098 | 300/1464 |
| | 6 | 180/878 | 270/1317 | 360/1756 |
| | 7 | 210/1025 | 315/1537 | 420/2049 |
| | 8 | 240/1171 | 360/1756 | 480/2315 |
| 9 | 4 | 120/586 | 180/878 | 240/1171 |
| | 5 | 150/732 | 225/1098 | 300/1464 |
| | 6 | 180/878 | 270/1317 | 360/1756 |
| | 7 | 210/1025 | 315/1537 | 420/2049 |
| | 8 | 240/1171 | 360/1756 | 480/2315 |
| | 9 | 270/1317 | 405/1976 | 540/2635 |

Sandy gravel and/or gravel (GW and GP)
Sand, silty sand, clayey sand, silty gravel and clayey gravel (SW, SP, SM, SC, GM and GC)
Clay, sandy clay, silty clay, clayey silt, silt and sandy silt (CL, ML, MH and CH)

FIG. 6E

METHOD OF FABRICATING BUILDING WALL PANELS

CROSS REFERENCE TO RELATED APPLICATIONS

This application is a Non-Provisional of 61/008,379, filed Dec. 19, 2007, this application is a Continuation-in-Part of application Ser. No. 11/901,174 filed Sep. 13, 2007, this application is a Continuation-in-Part of application Ser. No. 11/901,057, filed Sep. 13, 2007, this application is a Continuation-in-Part of application Ser. No. 11/900,987, filed Sep. 13, 2007, this application is a Continuation-in-Part of application Ser. No. 11/900,998, filed Sep. 13, 2007, this application is a Continuation-in-Part of application Ser. No. 11/901,059, filed Sep. 13, 2007, this application is a Continuation-in-Part of application Ser. No. 11/901,173, filed Sep. 13, 2007, this application is a Continuation-in-Part of application Ser. No. 11/901,175, filed Sep. 13, 2007, this application is a Non-Provisional of application Ser. No. 60/872,929, filed Dec. 4, 2006, this application is a Non-Provisional of 60/876,403, filed Dec. 21, 2006, this application is a Non-Provisional of application Ser. No. 60/923,822, filed Apr. 16, 2007, each of the above being incorporated by reference in its entirety.

BACKGROUND OF THE INVENTION

This invention relates to building systems which largely replace concrete, whether ready-mix concrete or pre-fabricated concrete blocks, or other pre-fabricated concrete products, in construction projects. In general, the invention replaces the concrete in below-grade frost walls and foundation walls, in above-grade walls and in concrete footers, and in post pads. Such concrete structures are replaced, in the invention, with pultruded structures, and structures otherwise fabricated, such structures being based on resin-impregnated, fiber-based layers, as composite materials, also known as fiber-reinforced polymer materials (FRP). Such structures typically include thermally insulating foam, and optionally include regularly-spaced "studs", especially in upright, below-grade wall sections. Thus, with the exception of concrete flat work such as concrete floors, the conventional ready-mix concrete truck is not needed at the construction site.

In conventional foundation construction, first a concrete footer is formed and poured using ready-mix concrete. After the poured concrete footer has cured to a sufficient degree, such as a few days later, concrete forms, e.g. 4-8 feet (1.8-3.6 meters) high, are brought in, assembled on site, and erected on top of the footer. Ready-mix concrete is then poured, from a ready-mix truck, into the forms and allowed to set up and cure, to thus create the foundation walls, which may be a frost wall if no basement is planned.

In the alternative, and still addressing conventional foundation construction, the upright portion of the foundation wall can be built using pre-fabricated concrete masonry units (cmu's) and mortar, typically supported by conventional poured concrete footers.

In yet another conventional type construction, the frost walls or foundation walls are built using mortared concrete blocks.

In any event, in such conventional structures, as the concrete is being finished at the tops of the forms, or at the top course of concrete blocks, bolts or other hold-down anchors are partially embedded in the setting-up concrete or mortar such that the anchors extend from the top of the foundation wall and, once the poured concrete, or mortar, has set up, such anchors serve as hold-down anchors, for example to mount a top plate, also known as a mud sill, to the top of the foundation wall, thus to anchor the overlying building structure to the foundation or frost wall. Once the concrete in a conventionally-poured foundation wall sets up, the forms are removed, e.g. 1-2 days after the ready-mix concrete is poured into the forms, and a wood, or wood-product, or other top plate is anchored to the top of the concrete foundation wall, using the anchors which are embedded in the concrete at the top of the concrete foundation wall. A similar waiting time is needed with a mortared concrete block wall, before the top plate is anchored to the top of the so fabricated wall.

The above-noted poured concrete wall construction process, and concrete block construction process, both require a substantial quantity of concrete materials, investment in forms, substantial on-site labor and several days of time to fabricate the building foundation on which the ground floor of the building can then be erected. If construction is done in winter in a northern climate, the concrete is typically heated, incurring an associated cost, in order to facilitate curing of the concrete.

In addition, a resulting such concrete foundation wall is permeable to water and so must be water-proofed though, even after a conventional water-proofing coating has been applied to make the foundation wall water-proof, water leakage through such concrete foundation wall, whether ready-mix wall or concrete block wall, is rather common. Further, a concrete wall is a good heat conductor, and thus should be insulated to avoid heat loss by conduction through the concrete to the soil or other fill which surrounds the building. However, the affect of such insulation is limited because only relatively thin insulation materials are commonly used with underground concrete wall construction.

Yet further, if the level of the building inside the concrete wall is to be inhabited, whether below grade, e.g. foundation wall, or above grade, then stud furring e.g. 2×4 studs or 2×6 studs are typically attached to the concrete wall as a substrate which facilitates installation of insulation and utilities, and serves as a substrate for installing a finished interior wall surface such as drywall or paneling. Such furring takes up interior space inside the building as well as costing additional time and money to install.

The overall time required to construct such building foundation can be reduced by fabricating concrete walls off-site and erecting the fabricated walls in place on site, using a crane. However, each such wall element must be custom-designed, adding to the cost; and relatively heavy-duty mechanical lifting equipment, e.g. the crane, must be brought to the construction site, also a cost item.

Getting foundation walls installed in a timely manner, to accommodate timely delivery of constructed homes and other buildings to buyers, is a significant issue in the construction business. There are many reasons why foundations are not installed in accord with a planned schedule. A substantial such problem is weather. The weather in northern climates can be below freezing for several months of the year, which makes it difficult to get foundations installed. In addition, installing quality concrete foundation walls requires skilled labor, as well as skilled subcontractors, including the subcontractors' skilled labor.

Another known method of constructing structural walls is the use of Insulated Concrete Form (ICF) walls. In such construction, insulated forms are erected on footers, and receive ready-mix poured concrete. After curing, the outer portions of the forms are left as a layer of thermal insulation between the concrete and at least one of the inner and outer surfaces of the resulting wall. Although ICF walls do offer a relatively higher level of thermal insulation than a conventional uninsulated concrete wall, an ICF wall is typically more expensive than a plain concrete wall, and is more difficult to finish than a plain concrete wall, whether finishing the insulated interior of the wall or the insulated exterior of the wall.

Yet another alternative conventional foundation wall system is constructed of wood which has been treated to inhibit decay, and corresponding decomposition of the wood. Such treated wood is well known and is conventionally available. Such foundation walls typically include at least a bottom plate, and can be wrapped in plastic and then set on an aggregate stone footer. Wood foundations have a number of advantages, including enabling a manufacturer of such wood foundations to fabricate sections of such wall in the closed and controlled environment of a manufacturing facility, whereby selling and delivering such product is generally insensitive to weather conditions. Further, wood offers beneficial speed in constructing a building, and is relatively light weight compared to concrete.

However, wood foundations are not well received by the consuming public, as the public does not perceive quality in a building where wood is used in a below-grade application.

There is a need, in the construction industry, for relatively light weight structural building panels, for example generally continuous wall panels of any desired length up to a maximum length per panel, selectable in length, in height, and in thickness, which structural building panels can be used in applications where concrete is conventionally used in residential, light commercial, and light industrial construction, and which structural building panels are strong enough to bear both the compressive loads and the lateral loads which are typically imposed on concrete walls in such building structures.

There is also a need for walls which have superior moisture and water barrier properties.

There is yet further a need for walls which can be installed so as to be ready to support overlying building structure in a relatively shorter period of time.

There is still further a need for walls which can be installed at a lower life cycle cost.

There is further a need for accessories which support other structure which bears on such wall sections, and which serve as connectors between such wall sections and such other structure.

There is also a need for such walls which meet consumer expectations, both as to function and as to perception of quality.

These and other needs are alleviated, or at least attenuated, by the novel construction products and methods of the invention.

SUMMARY OF THE INVENTION

This invention represents wall panels, and methods of making wall panels for a tough, water-proof building system which provides wall, ceiling, and/or floor building panels and corresponding walls and wall sections, ceilings and ceiling sections, and floors and floor sections. The walls, taken in a vertical orientation, have both vertical compression-resistance strength, and horizontal bending-resistance strength, sufficient that the wall system can be used in both above-ground and below-ground building structural applications, including applications where such wall systems are exposed to severe wind and other weather, such as hurricanes, tornadoes, and the like. Such walls can replace concrete, and can meet required strength specifications for use in corresponding single family residential, light commercial, and light industrial applications.

Similarly, ceilings and floors can be made with building panels of the invention having vertical and horizontal loading capacities sufficient to support the loads typically imposed on corresponding ceilings and floors in single family residential, light commercial, and light industrial construction.

A wall structure of the invention has an outer waterproof layer, comprised of reinforcing fibers embedded in polymeric resin, and defining the outwardly-facing surface of the panel, an inner waterproof layer comprised of reinforcing fibers embedded in polymeric resin and defining the inwardly-facing surface of the panel, and at least one of (i) one or more structurally reinforcing webs, spaced from each other, and extending between the inner layer and the outer layer, and (ii) one or more foam boards filling spaces between the inner and outer layers. A plurality of fiber-reinforced polymeric structurally-reinforcing members can extend the full height of the erected wall panel, and can extend from locations at or proximate the inner surface of the outer layer to locations at or proximate an inner surface of the wall structure, at spaced locations along the length of the wall panel.

The inner layer, the outer layer, and the reinforcing members are all part of a fiber-reinforced, optionally pultruded, resinous structure.

Optionally, a reinforcing stud is attached to, or included in, the fabricated structure, and extends inwardly into the building beyond what is otherwise the inner surface of the building panel/wall panel. The stud can originate at either the inner layer or the outer layer of the pultruded structure.

The spaces between ones of the structurally reinforcing member, and between the inner and outer layers, are optionally filled with rigid insulating foam material such as polyurethane foam or polystyrene foam, phenolic foam, or polyisocyanurate foam.

The structurally-reinforcing members may be integral with the inner and outer layers, whereby the reinforcing elements of the structurally-reinforcing members, which extend between the inner and outer layers, function in a capacity similar to the web of an I-beam, and associated portions of the inner and outer layers, function in capacities similar to the functioning of flanges of such I-beam. The overall I-beam effect provides, in an upstanding wall panel, or wall, both horizontal bending resistance and vertical compressive strength, sufficient to support both the vertical compressive loads, and the lateral side loads, for which building walls are designed, and can provide such sufficient levels of strength in cross-sections which are no greater than the cross-sections of steel reinforced concrete walls which are conventionally used in such applications, while avoiding the drawbacks of concrete.

A foundation wall of the invention can be laid directly on a leveled bed of stone aggregate as a footer. Alternatively, foundation walls of the invention can be laid on a poured concrete footer, with suitable gasketing between the concrete footer and a lower surface of the foundation wall, to accommodate deviations in the top surface of such concrete footer. Still further, the footer can be elongate support pads made with fiber-reinforced polymeric materials described herein for use in making the building panels of the invention.

The invention comprehends that when buildings and other structures are constructed using the inventive structural elements and members disclosed herein, such buildings, and other structures, themselves, as well as respective substructures and subassemblies which are related to such buildings and structures, are inventive.

The invention generally comprises building panels, and methods of fabricating building panels as either defined-length panels and defined-height panels, in controlled-environment manufacturing facilities. Taken in an upright orientation, such building panel has a defined length, a defined thickness, and a defined height. A continuously-pultruded panel can be cut to any desired height along the length of the pultruded product, and panels can be joined and/or cut to provide any desired panel lengths, at the manufacturing facility. Thus, walls and wall panels can be delivered from the manufacturing facility in a variety of lengths and/or heights. In addition, the panels can be cut as needed at the construction site such as to create rough openings for windows and/or doors.

An exemplary method for manufacturing such building panels comprises continuously pultruding panels having defined default panel lengths and thicknesses, cutting the panels at desired panel heights, and joining adjacent panels at panel edges and/or cutting panels or panel assemblies to achieve desired panel lengths. Thermally-insulating foam can be incorporated into the pultruded structure, either during fabrication of the pultrusion product, or after the pultrusion product has been cured, dimensionally set.

The panels can be formed with or without studs which extend, from the inner layer, away from the outer layer. A stud leg can be aligned with one of the structurally reinforcing members. Under load of an overlying building, panels with studs deflect outwardly of the building toward the soil backfill. When installed on a fabricated footer, a panel of the invention can vary in height by a factor of no more than 0.25 inch (6.4 mm) over a 40 foot (12.7 m) distance. In a 9 foot (2.7 m) high wall, load distribution at the footer varies by no more than 25% over any 10 foot (3.05 m) length of a foundation wall of the invention.

For example, pre-fabricated foam blocks can be fed into the pultrusion process along with resin and reinforcing fiber. The foam blocks may be pre-wrapped with fiberglass, or the foam blocks and fiber can be fed separately to the pultrusion process.

The invention still further comprehends methods of constructing buildings, comprising constructing a building or building appurtenance, the method comprising excavating a hole to establish a natural base on which the structure is to be supported and constructed; establishing layout locations where upright walls or other supports of the structure are to be erected; establishing a fabricated footer, optionally a pultruded fiber-reinforced polymeric footer, along the laid-out locations of the supports; placing pre-fabricated load-bearing pultruded building panels or other supports on the fabricated footer; connecting the pre-fabricated wall panels or other supports to each other if and as desired thereby developing load-bearing walls or other supports; and erecting overlying structure on the load-bearing walls or other supports.

BRIEF DESCRIPTION OF THE DRAWINGS

FIG. 2 is a fragmented interior view of a section of one of the upstanding wall structures shown in FIG. 1.

FIG. 3 is an elevation-view cross-section of the upstanding wall structure taken at 3-3 of FIG. 1.

FIG. 4 is an outside elevation representation of the upstanding wall structure of FIG. 3.

FIG. 6E is a chart showing typical relative lateral loading for three wall heights, each for three soil types, generally showing lateral force, loading information in table format.

Figure 1:
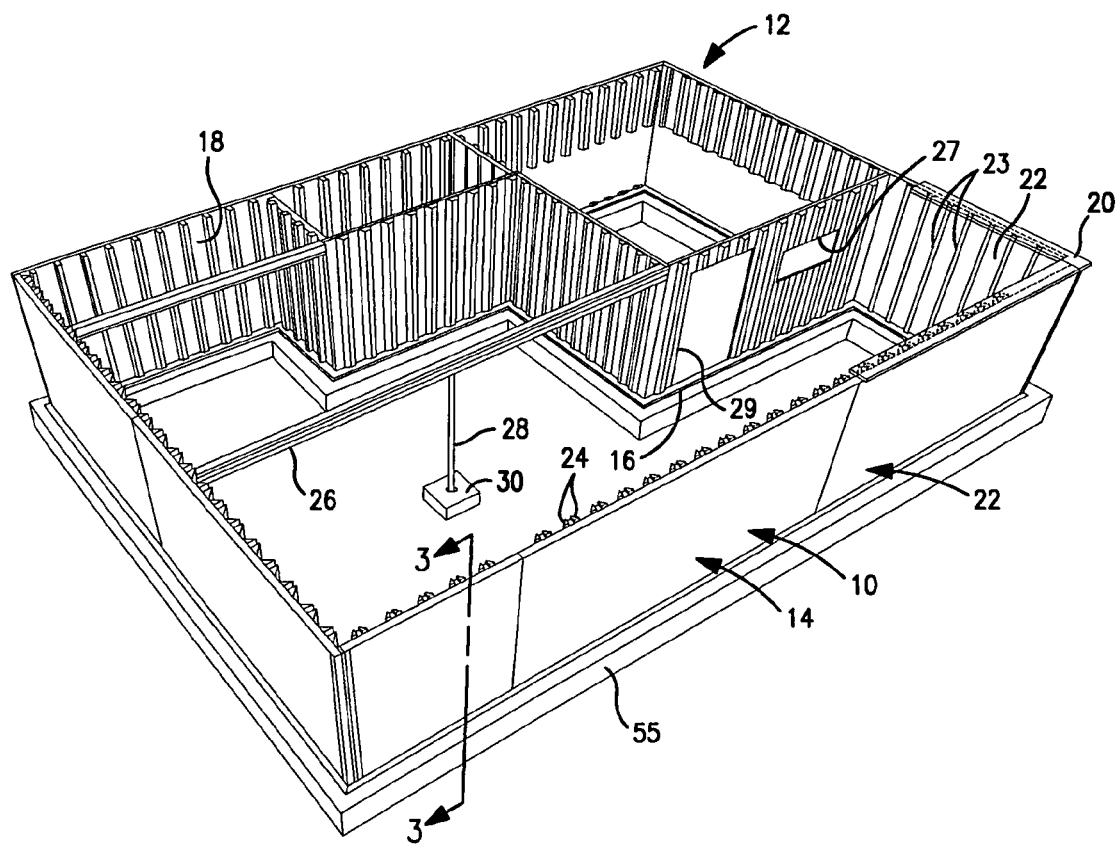
FIG. 1 shows a representative pictorial view, with parts removed, of a building foundation wall fabricated using building system structures of the invention.

The invention is not limited in its application to the details of construction, or to the arrangement of the components set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

DETAILED DESCRIPTION OF THE ILLUSTRATED EMBODIMENTS

Referring to FIG. 1, a plurality of interior and exterior foundation walls 10 collectively define the foundation 12 of a building. Each foundation wall 10 is defined by one or more foundation wall panels 14. In the illustration, each foundation wall panel 14 includes a bottom plate 16, an upstanding wall section 18, and a top plate/mud sill 20. As used herein, "wall panel" 14 may refer to wall section 18 without top plate 20 or bottom plate 16. Each upstanding wall section 18 includes a main-run wall section 22, and uprightly-oriented reinforcing studs 23 affixed to, or integral with, the main-run wall section, regularly spaced along the length of the wall section, and extending inwardly of the inner surface of the main run wall section. In the embodiment illustrated in FIG. 1, anchoring brackets 24 are mounted to the studs at the tops and bottoms of the wall section, thus to assist in anchoring the bottom plate and the top plate, and/or any other attachment, to the main run portion of the upstanding wall section.

A given stud 23 (FIGS. 1-2 and 4-5) or 123 (FIGS. 3, 6, 6A, 6B, and 17) has an end panel 130, and side panels 128 which extend from the main run portion of the wall panel to end panel 130.

As illustrated in FIG. 1, conventional e.g. steel I-beams 26 are mounted to the wall sections, as needed, to support spans of overlying floors. Such steel I-beam can be supported at one or more locations along the span of the I-beam, as needed, by either conventional e.g. steel posts, or by resin-fiber composite posts 28 of the invention (FIGS. 1 and 8-12) and/or resin-fiber composite pads 30 (FIGS. 1 and 8-12) of the invention. Additional support posts can be employed at or adjacent the ends of the I-beams as needed to satisfy specific, individual load-bearing requirements of the building design. Fiberglass-reinforced brackets, or reinforcing studs 123 (FIGS. 3 and 5) or conventional e.g. steel brackets, can be used to attach and/or support the I-beams relative to respective panels of the foundation wall using e.g. conventional steel bolts. Studs 23, are cut off, as needed, to support the I-beam at the desired height. Multiple studs can be used side-by-side, as needed, to provide the desired load-bearing capacity. In the alternative, beam pockets can be fabricated in the foundation wall to receive the ends of the I-beam.

Figure 5:
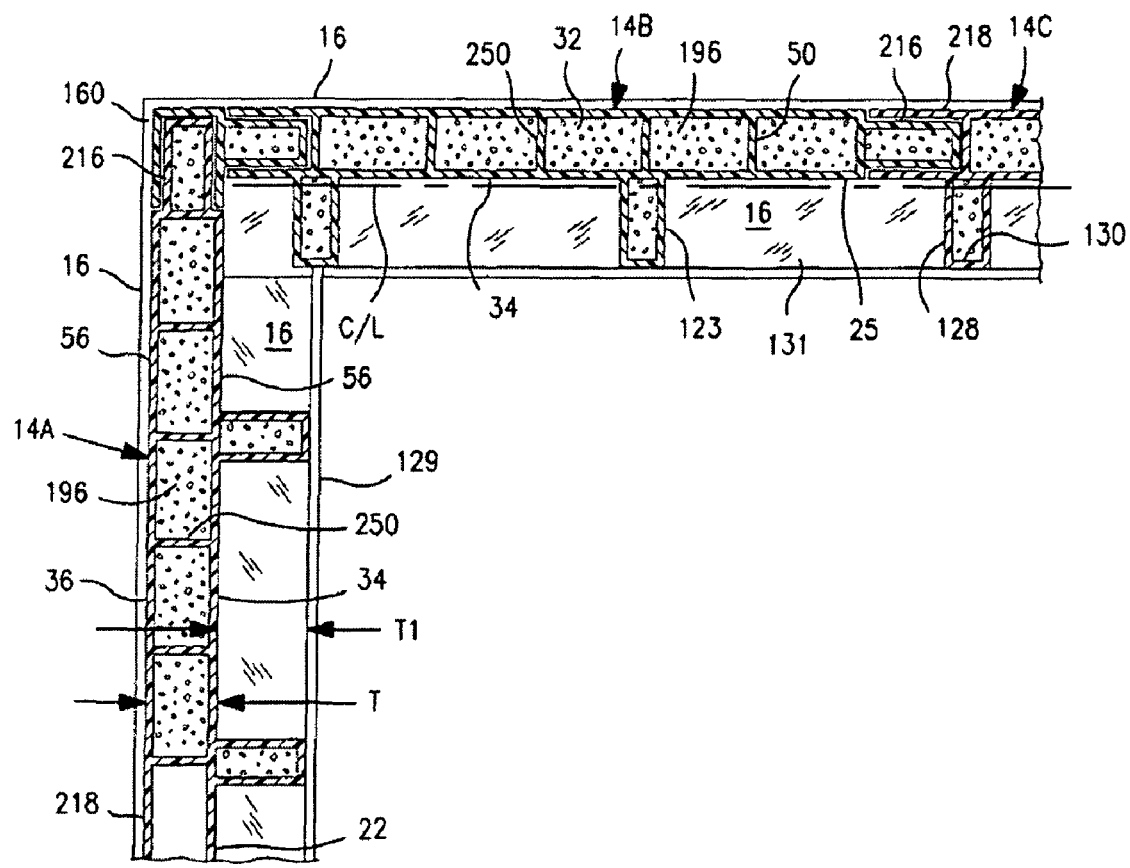
FIG. 5 is a plan-view cross-section of a portion of a foundation wall, below any brick ledge, according to a second embodiment of the invention, with studs, and with a layer of drywall attached over the studs, and viewing the base plate between the drywall and a main run section of the panel.

Referring now to FIGS. 3 and 5, the main run portion 22 of the wall section is generally defined between the inner surface 25 and the outer surface 56 of the wall panel, without considering the thickness contribution of stud 23 to the wall panel. The main run portion of the wall section can be a pultruded structural profile, which optionally includes thermally insulating foam in pultrusion cavities. The foam can be foamed in place thermally insulating material in the pultrusion cavities. Alternatively, the foam can be fed as foam blocks into the pultrusion process such that the pultruded resin/fiberglass composition forms about the foam blocks. Bottom plate 16 and top plate 20 can be secured to the main run portion of the wall section with the support of wedge-shaped brackets 24 (FIGS. 2, 14, and 14A), or other supporting bracket structure, optionally in combination with adhesive or additional curable polymeric resin. The selection of adhesive depends on the selection of the material from which the top plate is made, as well as the specific material which forms the respective wall section pultrusion, and the material from which bracket 24 is made. An exemplary adhesive is Pro-Series QB-300 Multi-Purpose Adhesive, available from OSI Sealant Company, Mentor, Ohio. Such adhesive can be used as desired to secure various elements of the building panel assembly to each other.

The foam material in the wall panel cavities is of sufficient density, rigidity, and polymer selection to provide the desired level of thermal insulation between the inwardly-facing surface of the wall and the outwardly-facing surface of the wall.

Bottom plate 16 can be a fiber-reinforced, e.g. fiberglass-reinforced, polymeric structural member, of such dimensions and structure as to be sufficiently rigid, and with sufficient strength, to support both the foundation wall and the overlying building superstructure, from an underlying fabricated base defined by e.g. a settled bed 53 (FIG. 6) of stone aggregate, from an underlying fabricated base comprising a concrete footer 55 (FIG. 3), or from other suitable underlying fabricated supporting base. The specific structural requirements of bottom plate 16 can be engineered based on the loads to be applied to the wall which is supported by the supporting base.

A pultruded fiber-reinforced product e.g. 0.075 inch (1.9 mm) to about 0.5 inch (13 mm) thick has been found to be satisfactory as the bottom plate for general-purpose and typical single-family residential, light commercial, and light industrial construction.

The bottom plate can be attached to the upstanding wall section, and optional support brackets 24 by adhesive, by curable resin such as that used in the wall panel, by steel bolts which extend through an upright leg of the bottom plate e.g. adjacent the outer surface of the upstanding wall section and through the adjacent portion of the upstanding wall section, or by a combination of metal anchors and adhesive and/or resin or by other attachment mechanism. In any event, the bottom plate, when attached to the upstanding wall section, is sufficiently wide, thick, dense, and rigid, to provide effective compression and bending support, thus to support the foundation wall from the underlying soil and/or rock and/or stone, or other natural base albeit typically through a fabricated footing.

The bottom plate typically extends laterally inwardly into the building beyond the primary surface of the inner layer by a distance corresponding to at least the maximum thickness of the building panel which includes stud 123, thus to present a suitably-sized bearing surface to the underlying support base/footer whereby the overlying load can be borne by the underlying footer without causing substantial vertical or lateral movement in the underlying natural support base of soil, stone, or rock. In the alternative, the bottom plate can extend outwardly from the building panel, away from the building, to provide the recited suitably-sized bearing surface, or can extend both inwardly and outwardly from the building panel.

The top plate can be made of wrapped layers of fiberglass, can be a pultruded resin-fiber composite, can be conventional wood, or a manufactured wood product, or other conventional construction material, each such structure being sufficiently wide and thick to provide a support surface, interfacing with the underlying upstanding wall section, and from which the overlying superstructure of the building can be supported. The top plate can conveniently be made from conventional wood building materials whereby overlying building structures can be conventionally attached to the underlying foundation wall structure at the building site by use of conventional fasteners, conventionally attached to the top plate.

The combination of the inner and outer layers 34, 36 of the wall panel, and the reinforcing studs 123, is sufficiently strong to withstand the inwardly-directed lateral, e.g. bending, forces which are imposed on a foundation wall by the ground, or on above-ground walls by wind loads, both imposed from outside the building.

Figure 6:
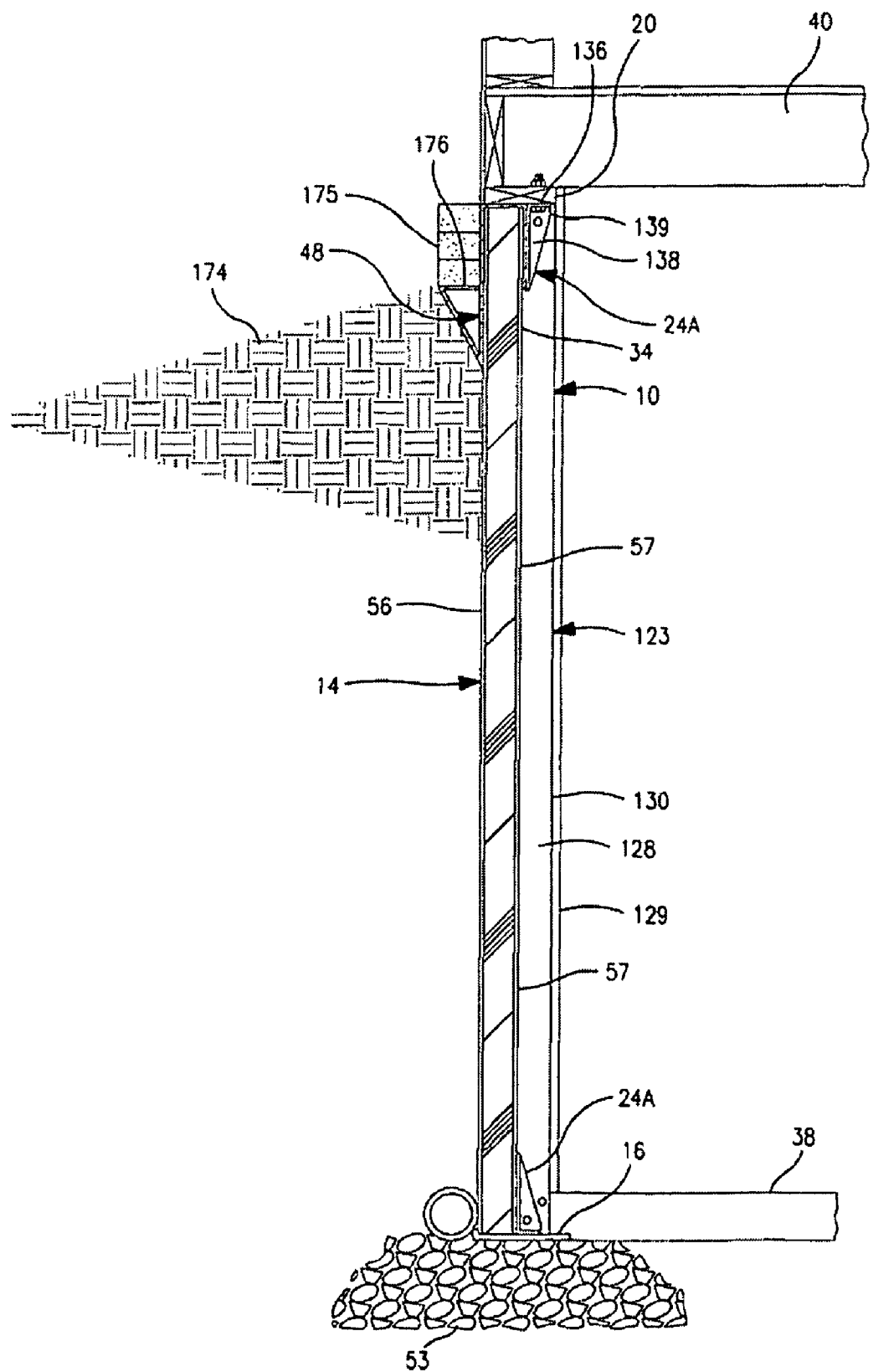
FIG. 6 is an elevation view cross-section of the foundation wall structure illustrated in FIG. 5, showing a brick ledge.

A suitable illustrative footer can be fabricated from aggregate stone, illustrated as 53 in FIG. 6, or concrete as illustrated at 55 in FIG. 3. A suitable exemplary aggregate stone has a size which passes through a 1 inch mesh and does not pass through a ¾ inch (1.9 cm) mesh.

Referring to FIGS. 1, 3, and 6, once the foundation wall 10 is in place as illustrated in FIG. 1, on a suitable footer (53, 55), a conventional ready-mix concrete slab floor 38 is poured. The concrete slab floor extends over, and thus overlies, that portion of the bottom plate 16 which extends inwardly from any of the inner surfaces of the wall panels, including both the main run wall section and studs 23. Namely, the concrete slab floor extends to, and abuts against, the inner surfaces of the respective upstanding wall sections 18. Accordingly, once the concrete slab floor is cured, inwardly-directed lateral forces, imposed by the ground outside the building, at the bottom of the wall, and taken in a direction aligned with the width of bottom plate 16, are resisted, opposed, nullified, by the structural e.g. lateral/side-to-side compressive strength of the concrete floor slab 38 in support of foundation wall 10, as the edge of the slab abuts the inner surface of the foundation wall. Thus, inwardly-directed lateral forces which are imposed on the foundation wall adjacent bottom plate 16 are ultimately resisted, and absorbed, by slab 38.

Inwardly-directed lateral forces which are imposed on the foundation wall at or adjacent top plate 20 can be transferred to main floor 40 of the building (FIGS. 3, 6, and 6A) e.g. by conventional mechanical fasteners and standard construction techniques which mechanically attach the main floor 40 and the foundation wall 10 to each other, or otherwise cause the main floor and the foundation to act together cooperatively.

Still referring to the main run wall section 22 (FIGS. 1, 3, and 5), and considering the structural environment of typical 1-story and 2-story residential construction, the inner 34 and outer 36 pultruded layers are e.g. between about 0.75 mm and about 12.7 mm (between about 0.03 inch and about 0.5 inch) thick. Thicknesses of the inner 34 and outer 36 layers are generally constant. Outer layer 36 can be e.g. ribbed to enhance the ability of the wall to withstand the imposition of laterally-directed loads on the wall without further increasing the layer thickness.

In the embodiments illustrated in FIGS. 1-5, studs 123, where used, run the full height of the main wall section, and extend from the inner surface 52 of the inner fiberglass layer 34, inwardly a desired distance so as to provide the desired level of structural strength to wall panel 14. Thus, studs 123 function as reinforcing members in wall panel 14.

Compared to e.g. a 2.0 inch (5.1 cm) thick wall section, 8 feet (2.4 m) in height, having no reinforcing member, a corresponding wall which incorporates studs 123 on 16 inch (40.6 cm) centers, and extending about 3.5 inches (about 8.9 cm) exhibits at least about 75% increased bending resistance. Such bending resistance is measured by applying a linear load which runs the length of the wall panel at mid-height of the wall panel, and which load is opposed by linear opposing blocking of corresponding lengths at the top and bottom of the wall panel.

Referring to FIGS. 1-5, in general, the inner and outer layers of the wall section are e.g. about 0.75 mm to about 12.7 mm (about 0.03 inch to about 0.5 inch) thick, optionally about 1.3 mm to about 5.1 mm (about 0.05 inch to about 0.2 inch) thick, optionally about 2.2 mm to about 2.5 mm (about 0.085 inch to about 0.100 inch) thick. Thermally insulating foam can fill the entirety of the space between the inner and outer layers 34 and 36. The foam can also fill the studs, as desired.

Wall section thickness "T" (FIG. 5) in the main-run wall section is defined without respect to the dimensions of any studs 123, and generally stops at the surface 25 of what is later defined herein as space 131. Thickness "T" can be as little as about 2 inches (5.1 cm) between the inner and outer surfaces of the wall, to as much as about 8 inches (20.3 cm) or more, as measured between the outer surface of layer 34 and the outer surface of layer 36, and ignoring studs 123 for purposes of defining thickness "T". Typical wall thickness "T" is about 3 inches (7.6 cm) to about 6 inches (15.2 cm).

The top plate and bottom plate can be conventional e.g. wood materials, with suitable waterproofing as appropriate for the intended use. In order to avoid issues of moisture contact with wood, typically the bottom plate is a fiberglass-reinforced pultruded resinous structure, of sufficient thickness and rigidity to provide the level of weight bearing capacity anticipated as being necessary for supporting the structure to be supported.

Structural building panels of the invention can be manufactured in any of the standard dimensional sizes, as well as in a variety of non-standard size combinations desired for a particular building project. Thus, for example and without limitation, such panels can have heights of about 4 feet (1.2 m), which accommodates use of the panels in 4-foot (1.2 m) frost walls. Height of about 9 feet (2.7 m) accommodates use of the panels in standard-height basement walls and standard-height above-grade walls.

Thickness "T" of the main run portion of a panel typically ranges from about 3 inches (7.6 cm) nominal thickness to about 8 inches (20.3 cm) nominal thickness. Studs 123 can extend inwardly from such nominal dimensions. Additional bending resistance can be obtained through the use of studs which extend inwardly from the nominal thickness. Such studs typically extend inwardly at least 3 inches (7.6 cm) in order to obtain the desired additional bending resistance, as well as to accommodate desirable thermal insulation properties, at acceptable cost efficiencies while facilitating the application of interior finishes to the wall. Such insulation properties can be obtained by adding conventional insulation material between studs at the inner surface of the panel.

Typically, thickness "T" greater than 8 inches (20.3 cm) is not needed in order to satisfy structural demands or thermal insulation demands in the light duty building implementations recited herein. However, in some instances, where extraordinary thermal or structural demands are to be imposed on the building panels, then thickness greater than 8 inches (20.3 cm) is contemplated.

Lengths of the panels is limited only by transportation limitations. For example, such panels can be as long as the length of the truck bed which will transport the panels to the construction site. Thus, based on vehicle length restrictions on public highways, length is generally limited to about 40 feet (12.2 m).

On the other hand, where suitable transportation is available, the panels can be as long as desired for the purpose intended.

Structural building panels of the invention provide a number of advantages. For example, a structural building wall can be manufactured as a unitary structure to any wall height. Ignoring shipping limitations, panels can be assembled at the manufacturing site to any desired length, which may be a generic length, for example 10 feet (3.05 m), or 20 feet (6.1 m), 30 feet (9.15 m), or 40 feet (12.2 m), or whatever length or lengths is or are desired. Wall length needed for a particular portion of a building wall can be cut from a generic-length building panel, at the construction site, to meet specific needs, or can be fabricated to specific length at the panel manufacturing site. Thus if a shorter length is needed for a particular portion of the wall run, the needed length can be cut e.g. from a 20-foot (6.1 m) section. If a longer length wall piece is needed, either a longer length panel can be fabricated at the panel-manufacturing site, or multiple pieces can be joined together to create the desired length wall section. Such joinder can be done either at the construction site or at the manufacturing site. The respective building panels can be cut to length, using e.g. a circular saw, a ring saw, or a reciprocating saw, employing e.g. a masonry blade.

Because the wall assembly is made primarily from fiberglass, the resin composition, and foam, the pounds per cubic foot density, and thus the unit weight per foot of length is relatively small compared to a concrete wall of corresponding dimensions. For example, a building panel 20 feet (6.1 m) in length, 8 feet (2.4 m) in height, and nominally 3 inches (7.6 cm) thick, weighs about 725 pounds (329 kg), including studs 123, and anchor brackets discussed elsewhere herein.

Similarly, a wall 9 feet (2.7 m) high weighs about 20 pounds per lineal foot to about 60 pounds per lineal foot (about 29.8 kg per lineal meter to about 89.3 kg per lineal meter), optionally about 27 pounds per lineal foot to about 55 pounds per lineal foot (about 40 kg per lineal meter to about 81 kg per lineal meter). Accordingly, no crane is necessarily needed on site for wall erection at or near ground level, or below ground level such as for a foundation wall. Rather, some such wall panels can be moved by manual labor only. In some instances, a light duty crane would be helpful.

Rough openings for windows 27 and/or doors 29, illustrated in FIG. 1, can be cut on site as desired, using the above-noted masonry blade. Accessories, and other connections between elements of the wall and between the wall and other building elements, can be mounted by drilling and bolting conventional building construction elements/fasteners to the building panel, or by use of self-tapping fasteners driven into the building panel, or by adhesive.

FIG. 5 represents a top view of a portion of a foundation wall, including a 90 degree corner in the foundation wall. FIG. 6 is a cross-section, in elevation view, of a portion of the foundation wall shown in FIGS. 2-4.

FIG. 5 shows that a substantial portion of the volume of the foundation wall is occupied by the series of cavities 196, filled with low-density insulating foam 32. Inner 34 and outer 36 layers of fiberglass-reinforced resin form the generic inner and outer layers of the wall panels 14.

In general, all the space between the inner surface 57 of the panel and the outer surface 56 of the panel is occupied by layer 34, by layer 36, by intercostal reinforcing webs 50, or by the foam, whereby little, if any, of the space between layers 34 and 36 is not occupied by one of the above-recited panel materials. Typically, substantially all of the inner space between layers 34 and 36 is occupied by panel materials. By so generally filling the space between layer 34 and layer 36, all of the panel elements are fixed in their positions relative to each other, and are affixed to each other whereby the panel is dimensionally quite stable under designed loading, and a desired level of thermal insulation is provided. Further, the panel is sufficiently resistant to laterally-directed loads imposed on the panel, from outside the building, whether subterranean ground loads or above-grade e.g. wind loads, that such loads are efficiently transferred from outer layer 36 to the other members of the panel, and respective portions of layers 34 and 36, and intercostals 50, and optionally foam 32, share in the support of any one load. The resulting panel is stiff, rigid, and sufficiently strong to support all loads, including severe weather loads, to which the panel is expected to be typically subjected under normal use environments in an intended building structure, including normal seasonal environmental extremes in the given geographical location.

Figure 17:
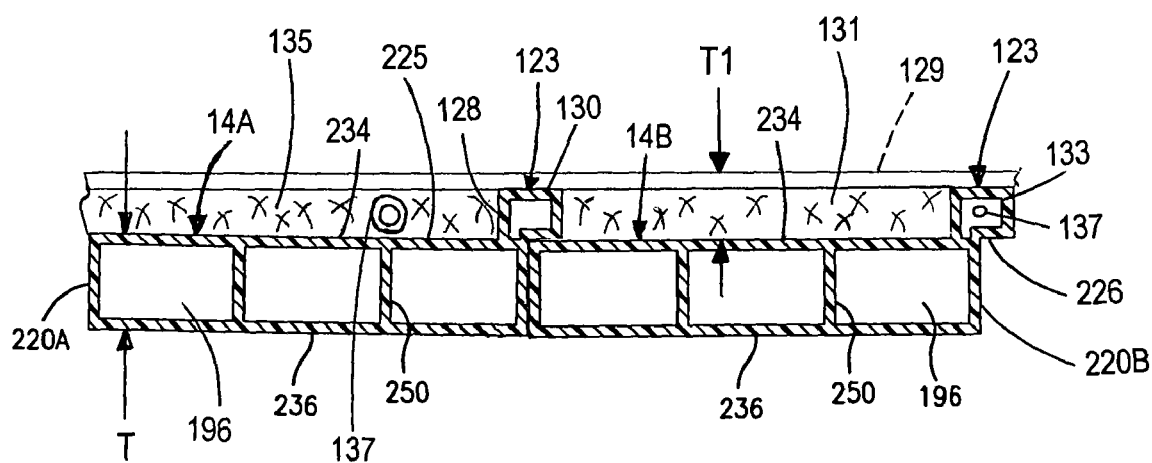
FIG. 17 shows a wall section illustrating plan view cross-sections of first and second upstanding building panels joined to each other in end-to-end relationship at the panel edges, including integral studs in the panels, and drywall being applied over the studs.

Studs 123 serve multiple functions. As a first function, studs 123 serve as mounting locations, for mounting surface materials such as drywall, paneling, or other interior sheet material 129, as illustrated in FIGS. 5 and 6, to form the interior finished surface of the wall as occupied living space. Referring to FIG. 17, space 131 between the studs provides channels for running e.g. additional insulation 135, and/or utilities 137 such as electricity, plumbing, and/or air ducting. Such utilities can also be run internally inside the hollow space 133 inside a stud 123. Another primary function of the stud is that the stud enhances both the vertical compressive strength and the horizontal point loading bending moment resistance strength of the wall. Thus, studs 123 and intercostals 250 can be collectively designed to provide a substantial portion of the desired level of strength for the wall panel.

Figure 14B:
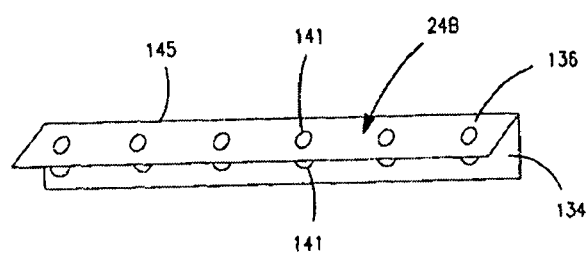
FIG. 14B is a line drawing pictorial view of an alternative resin-fiber composite angle bracket which can be used in place of brackets 14 and 14A.
Figure 14:
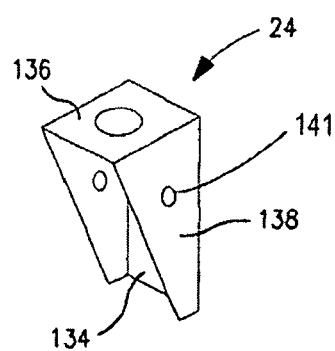
FIGS. 14 and 14A are line drawing pictorial views of resin-fiber composite plate anchor brackets useful proximate the tops and bottoms of wall panels of the invention e.g. for anchoring a top plate and/or a bottom plate to the wall panel, and for transferring lateral loads to the overlying floor.
Figure 14A:
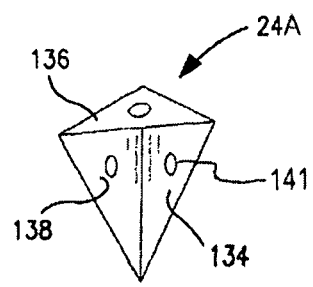

FIGS. 14, 14A, and 14B illustrate line representations of anchor brackets 24, 24A, and 24B. A bracket 24, 24A, or 24B is mounted to the interior surface of inner layer 34 at the top of the wall panel, using bracket panel 134, and brackets 24, 24A are optionally also bonded to stud 123 through a bracket side panel 138. Referring to FIG. 14, top panel 136 of bracket 24 extends transversely from, and is joined to, the top of base panel 134. First and second side panels 138 extend transversely from, and are joined to, both base panel 134 and top panel 136, whereby top panel 136 is supported from base panel 134 and side panels 138.

Base panel 134 of bracket 24 is positioned against inner layer 34 of the wall panel 14 and is mounted to inner layer 34 and optionally is mounted to stud 123 at side panel 138. Panels 134 and 138 can be mounted to inner layer 34 and stud 123 e.g. adhesively. Top panel 136 interfaces with and supports top plate 20, and typically is bolted to the top plate as illustrated in FIG. 6. Bracket 24 serves to transfer a portion of the load, on the top plate 20, to the main portion of the wall panel, thereby making the top plate an integral part of the foundation wall. Other portions of the top plate load are transferred to the wall panel by the surface-to-surface contact between the top plate and studs 123. Still other portions of the top plate load are transferred to the wall panel by direct surface-to-surface contact between the top plate and the top of the main run portion of the wall panel, optionally through a bracket 48 or 188 as illustrated in FIGS. 6, 6A, 6B, and 15.

One of side panels 138 is used to attach bracket 24 to stud 123, while base panel 134 is used to attach the bracket to inner layer 34. Accordingly, the second side panel has no necessary attachment function, and can thus be omitted in some embodiments. Bracket 24A of FIG. 14A illustrates such embodiment where bracket 24A is the same as bracket 24 of FIG. 14, with the exception of providing only a single side panel 138. In the embodiment of FIG. 14A, either of panels 134 and 138 can be used facing either inner layer 34 or stud 123.

In addition to transferring compressive loading forces from the overlying building load, brackets 24 and 24A transfer lateral side loads from the back-fill soil, which act on the wall panel, and transfer such side load through e.g. bolt 139 to top plate 20 and ultimately to the overlying floor 40, the side loads being generally dissipated in floor 40. Given that brackets 24, 24A depend on being mounted to studs 123, the spacing of brackets 24, 24A is limited to no more frequently than the spacing of the studs, whereby some lateral bowing of the wall panel may be experienced, stud-to-stud between the brackets.

In the embodiment of FIG. 14B, bracket 24B resembles a length of angle iron, but is preferably fabricated from FRP materials, e.g. is pultruded in such angle configuration. Bracket 24B is conveniently sized at about 12 inches (30.5 cm) length, whereby the length of the angle bracket readily extends between studs 123 on opposing sides of a cavity 131. Each flange 134, 136 extends about 2 inches (5.1 cm) from the joinder of flanges 134, 136, illustrated as 145. Bracket 24B is mounted with the long dimension of the bracket extending along the length of the panel, between edges 216 and 218, with one of flanges 134, 136 in surface-to-surface relationship with cap 342 (FIG. 6C) or top plate 20, and with the other of flanges 134 and 136 lying against inner layer 34 or corresponding other inner surface. Since the length of bracket 24B extends along the length of the wall panel, the bracket can be adhesively mounted to the top plate along substantially the full width of cavity 131, from stud to stud. In the alternative, or in addition, a plurality of fasteners can be employed along the length of the bracket, fastening the bracket to cap 342 or top plate 20 at intervals generally as closely spaced as desired through apertures 141 to prevent lateral bowing of the wall panel between studs 123.

Brackets 24, 24A, 24B can be made from other than FRP materials, but the FRP materials are preferred in order to maintain as much of a common material identity as reasonably possible throughout the wall structure.

FIG. 6 illustrates, in side elevation view, the interface of top plate anchor bracket 24 with top plate 20. In the illustrated embodiment, the top plate is a conventional wood board, and is secured to bracket 24 by a bolt 139 through top panel 136. FIG. 6 also illustrates a second anchor bracket 24 used in supporting the interface between the wall panel and bottom plate 16. Brackets 24, 24A and 24B can be used at the bottom plate equally well as at the top plate.

FIG. 5 illustrates joining together of two wall panels 14A and 14B using a corner bracket 160, having male and female connectors at right angles to each other, which can be used to join two wall panels at a right angle corner. FIG. 5 also shows in-line joinder of wall panels 14B and 14C to each other using respective male 216 and female 218 edges which are formed in the wall panels as the panel structure is formed, and wherein the male edge is received into, and joined with, the female edge as part of the process of edge-to-edge joining of adjacent ones of the wall panels. Typically, adhesive or curable resin is used in such edge-to-edge joining.

Figure 5A:
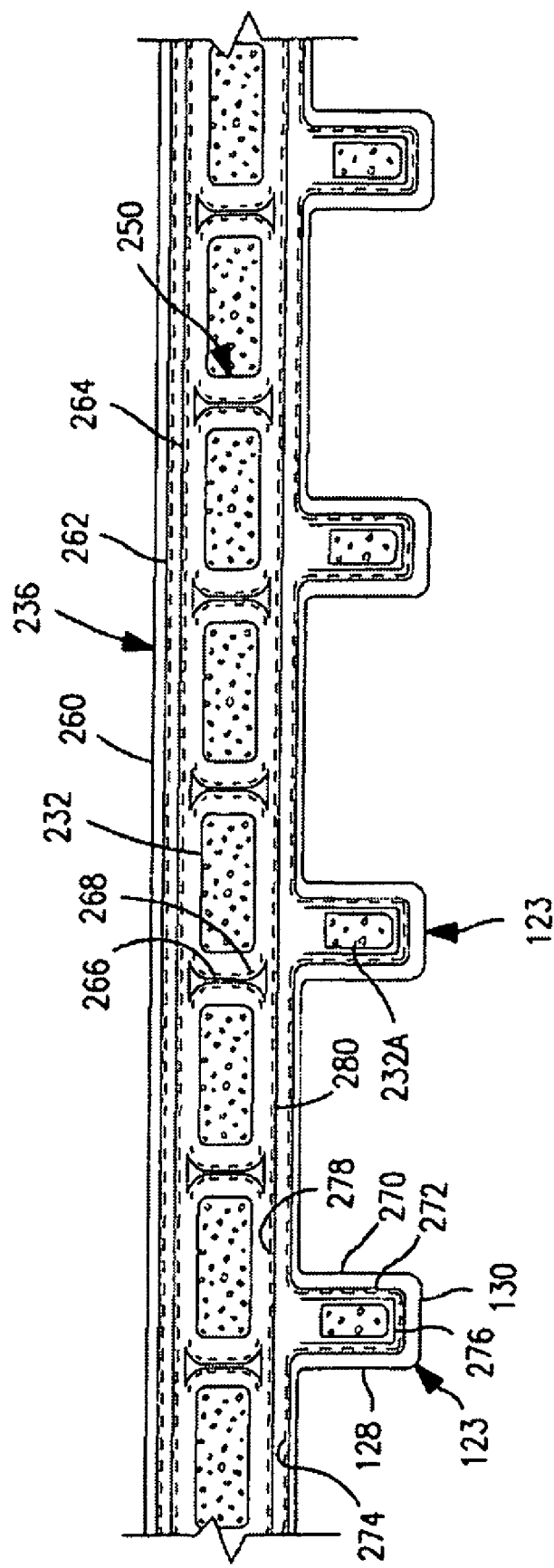
FIG. 5A is a glass schedule cross-section, showing glass uses in an exemplary portion of a wall panel of the invention.

FIG. 5A illustrates an exemplary glass schedule for a pultruded panel of the invention, wherein studs 123 are integral elements of the panel. FIG. 5A shows three primary structural layers of fiberglass in outer layer 236, two primary structural layers of fiberglass in inner layer 234, a third primary structural fiberglass layer at studs 123, and fiberglass rovings and continuous strand mats or chopped strand mats at intercostals 250. The empty spaces between the illustrated fiberglass elements and the die elements represents space which is occupied by the resin composition in the pultruded structure.

FIG. 5A is in fact an exploded view such that the space indicated for the resin is especially exaggerated.

FIG. 6 illustrates, in edge view, the addition of a fiberglass/resin support bracket 48 (FIG. 13) against the outer surface 56 of the wall. FIGS. 4 and 6 also illustrate, from a side elevation view of the outer surface of the wall, the extension of support bracket 48 as a brick ledge, along the full length of the main-run wall section. Bracket 48 transfers the weight of overlying bricks 175 to the underlying wall 10.

Still referring to FIG. 6, support bracket 48 extends outwardly from the outer surface 56 of the wall panel a sufficient distance, such as about 4 inches to about 5 inches (about 10.1 cm to about 12.7 cm), to support conventional brick or stone, or any other facing on the outside of the building. As indicated in FIG. 6, after completion of the construction work, earth or other backfill 174 typically fills up the excavated cavity around the foundation wall, to a level at or above brick support panel 176, thus concealing bracket 48.

Support bracket 48 can be installed facing inwardly at the top of an e.g. garage wall, thereby providing vertical edge support to a subsequently-poured concrete garage floor. Similarly, bracket 48 can be installed facing outwardly at the top of an e.g. garage or other wall, thereby providing vertical edge support to subsequently-installed brick or stone, or to support e.g. a concrete slab garage apron. First and second complementary brackets 48 can be mounted, one on top of the other, with brick support panel 176 of the first bracket 48 facing away from the building and the brick support panel 176 of the second bracket facing into the building. Such use of 2 brackets provides for wall support of both an adjoining edge of the garage floor and brick or stone or other exterior fascia, both of which are adjacent the foundation wall.

Figure 13:
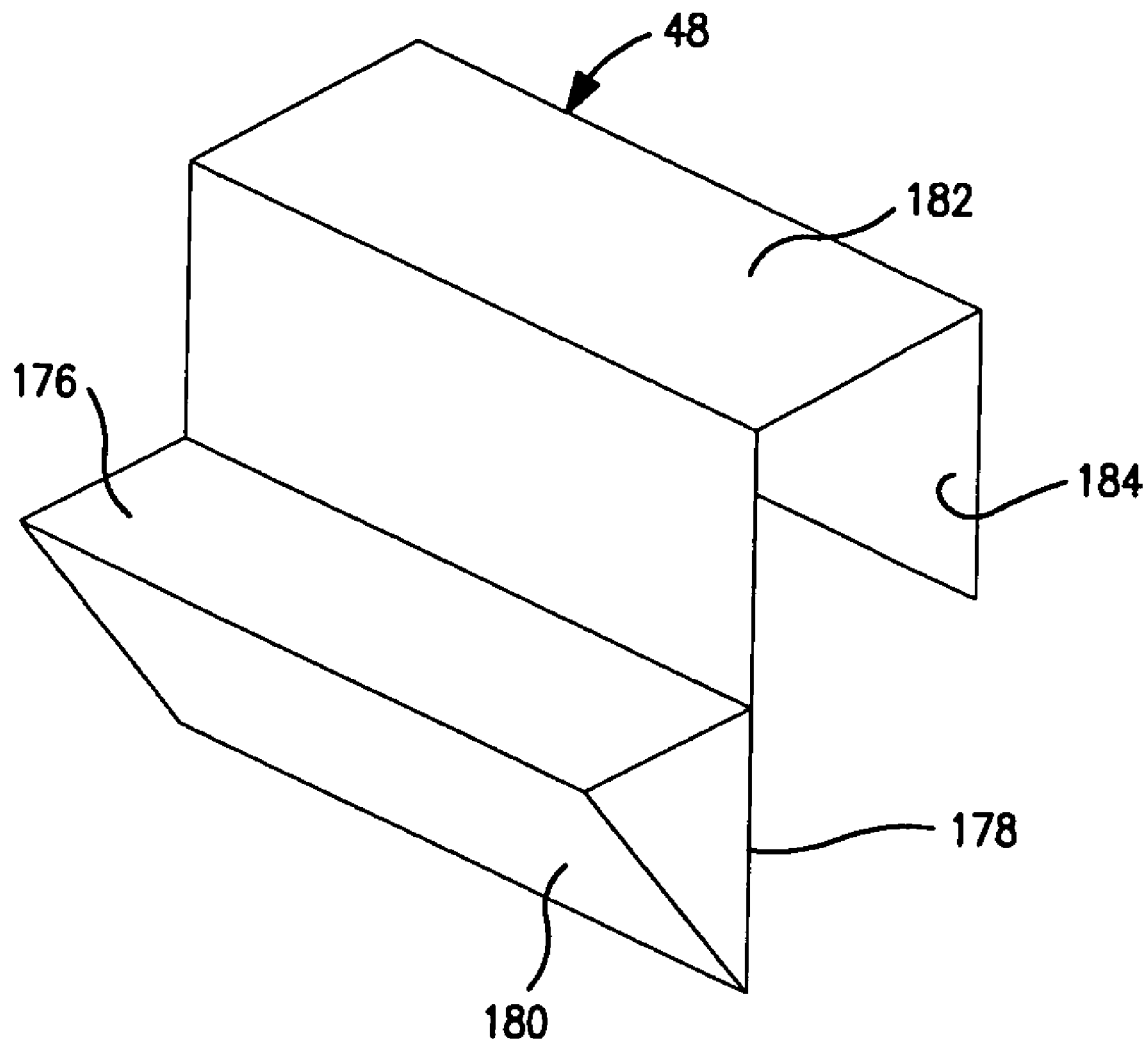
FIG. 13 is a pictorial line rendering of an optionally pultruded resin-fiber composite support bracket of the invention, which may be mounted on the top of a foundation wall of the invention as illustrated in FIG. 6.

A line representation of support bracket 48 is illustrated in FIG. 13. In the upright use orientation illustrated in FIGS. 3, 6, and 13, a base panel 178 of bracket 48 is oriented vertically along the outer surface 56 of building panel 14, and can optionally be bonded to panel 14. The brick support panel 176 extends outwardly from the base panel, above the bottom edge of the base panel. A bracing panel 180 extends upwardly from the bottom edge of the base panel to the outer edge of the brick support panel, transferring upwardly-directed structural support from the base panel to the outer edge of the brick support panel. An upper panel 182 extends horizontally from the top edge of the base panel and terminates at a downwardly-directed keeper panel 184. Upper panel 182 and keeper panel 184 collectively mount/hang the support bracket 48 from the top surface of the wall panel 14.

Figure 15:
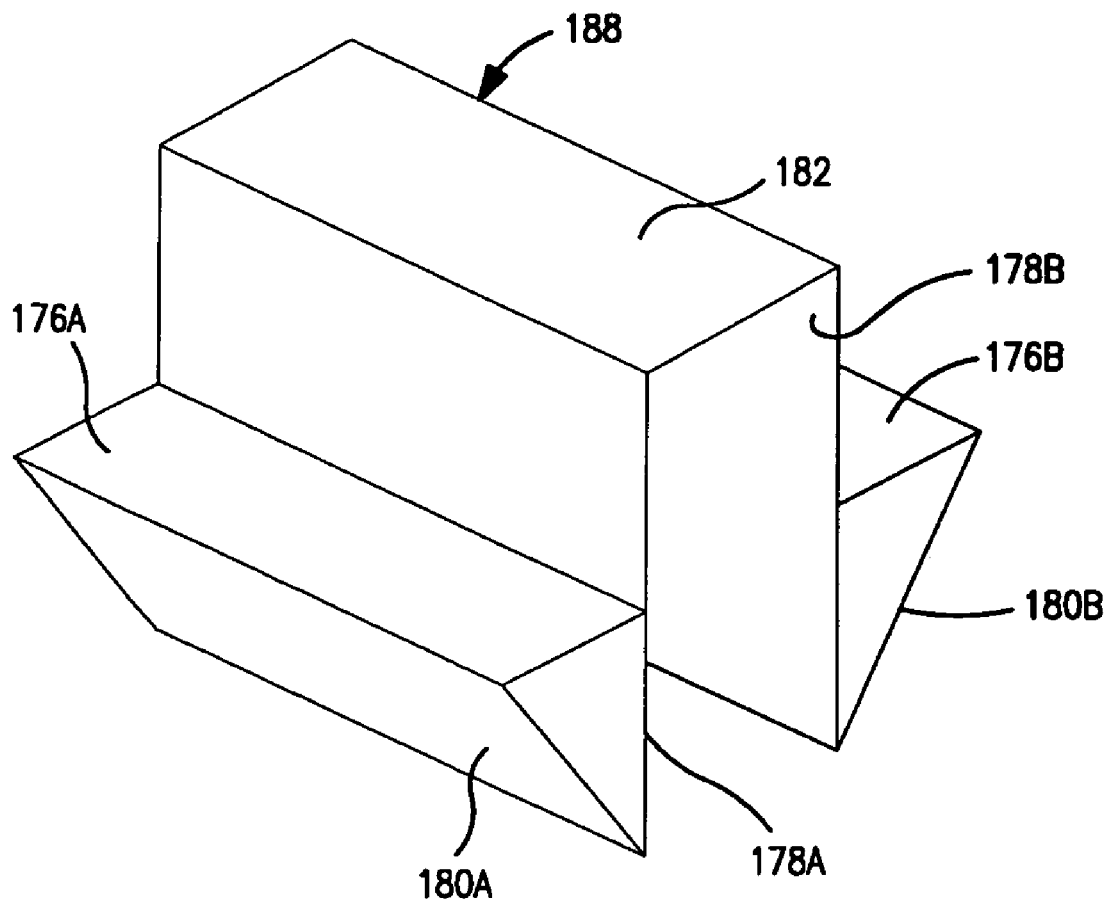
FIG. 15 is a pictorial line rendering of a resin-fiber composite floor and garage apron ledge bracket of the invention.

FIG. 15 illustrates a second embodiment of the support bracket, namely a two-sided support bracket which is designated as 188. Bracket 188 is designed and configured to support both (i) an edge of a garage floor which generally abuts the inwardly-facing surface of the foundation wall and (ii) a brick or stone fascia, or a concrete slab garage apron, which commonly face the outwardly-facing surface of an upper portion of the foundation wall, as well as to interface with an upstanding e.g. above-grade wall which overlies the foundation wall. The edge of the garage floor overlies a first support panel of the support bracket and thus loads the support bracket on the inward side of the foundation wall. The brick or stone fascia, or garage apron, overlies a second support panel of the support bracket and thus loads the support bracket on the outward side of the foundation wall. The loads imposed on the support panels are passed from the support bracket through the foundation wall to the footer, and thence to the underlying soil or other natural base which supports the respective wall.

As with support bracket 48, the two-sided support bracket 188 is installed at the top of the wall panel such that upper panel 182 bears upon the top surface of the wall panel. Base panel 178A extends downwardly from upper panel 182. Support panel 176A extends outwardly from base panel 178A, and is supported by bracing panel 180A. A second base panel 178B extends downwardly from upper panel 182, typically but not necessarily, a similar distance as base panel 178A so as to terminate at a lower edge having generally the same installed elevation as base panel 178A. Support panel 176B extends outwardly from base panel 178B, and is supported by bracing panel 180B.

A single support bracket 188 can thus be used in place of the above-recited first and second support brackets 48 where a concrete grade-level garage floor abuts the top of the foundation wall and a brick or stone fascia, or garage apron, is mounted to the other side of the foundation wall.

Similar to the operation of bracket 48, support panels 176A, 176B transfer the weight of the overlying e.g. loads of the brick or stone fascia, or garage apron, and the edge of the garage floor, to the wall, thence through the footer, and to the underlying natural base of e.g. soil or rock which supports the building.

Figure 6A:
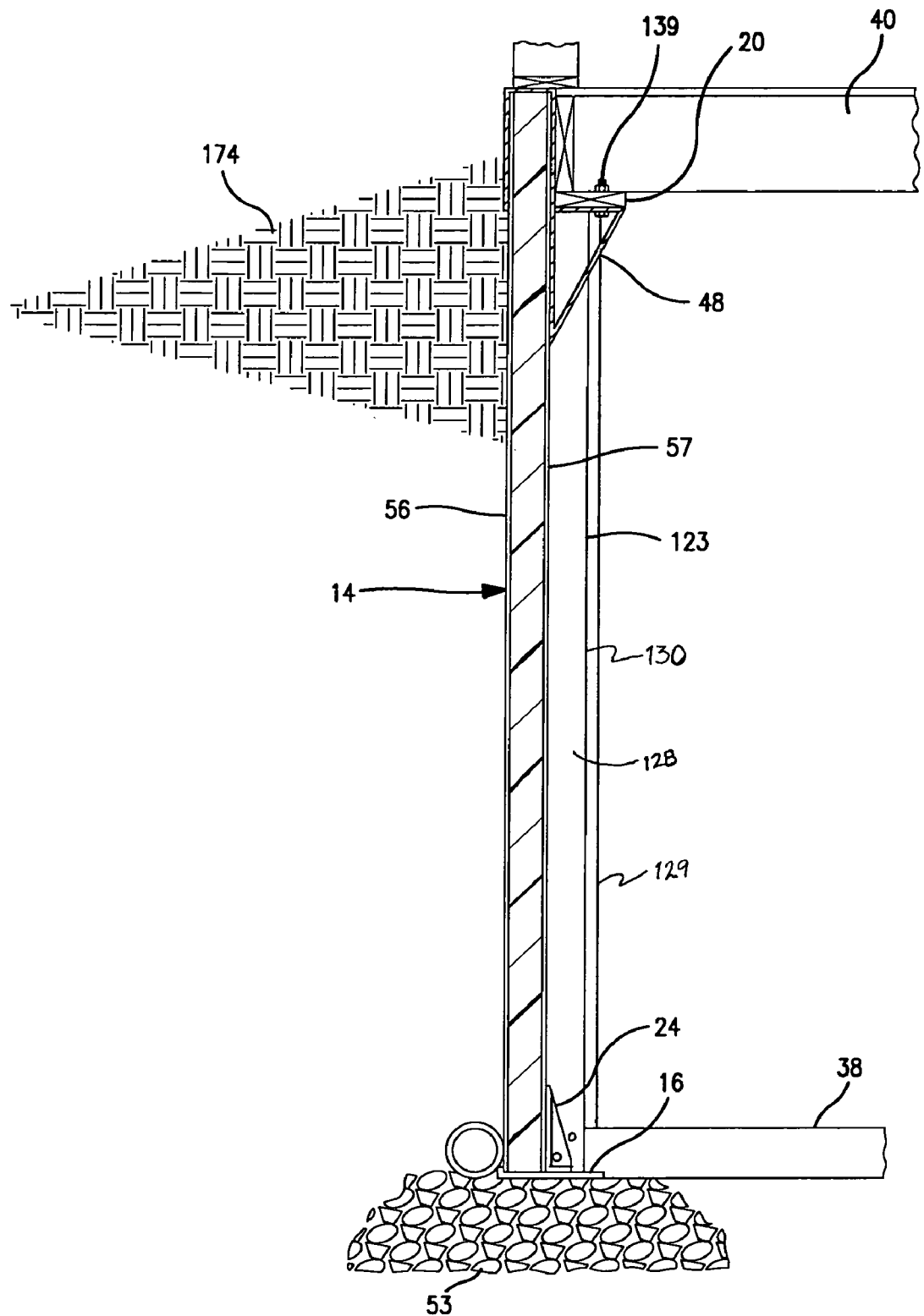
FIG. 6A is an elevation view cross-section as in FIG. 6, without the brick ledge, illustrating a different arrangement for supporting the overlying floor.
Figure 6B:
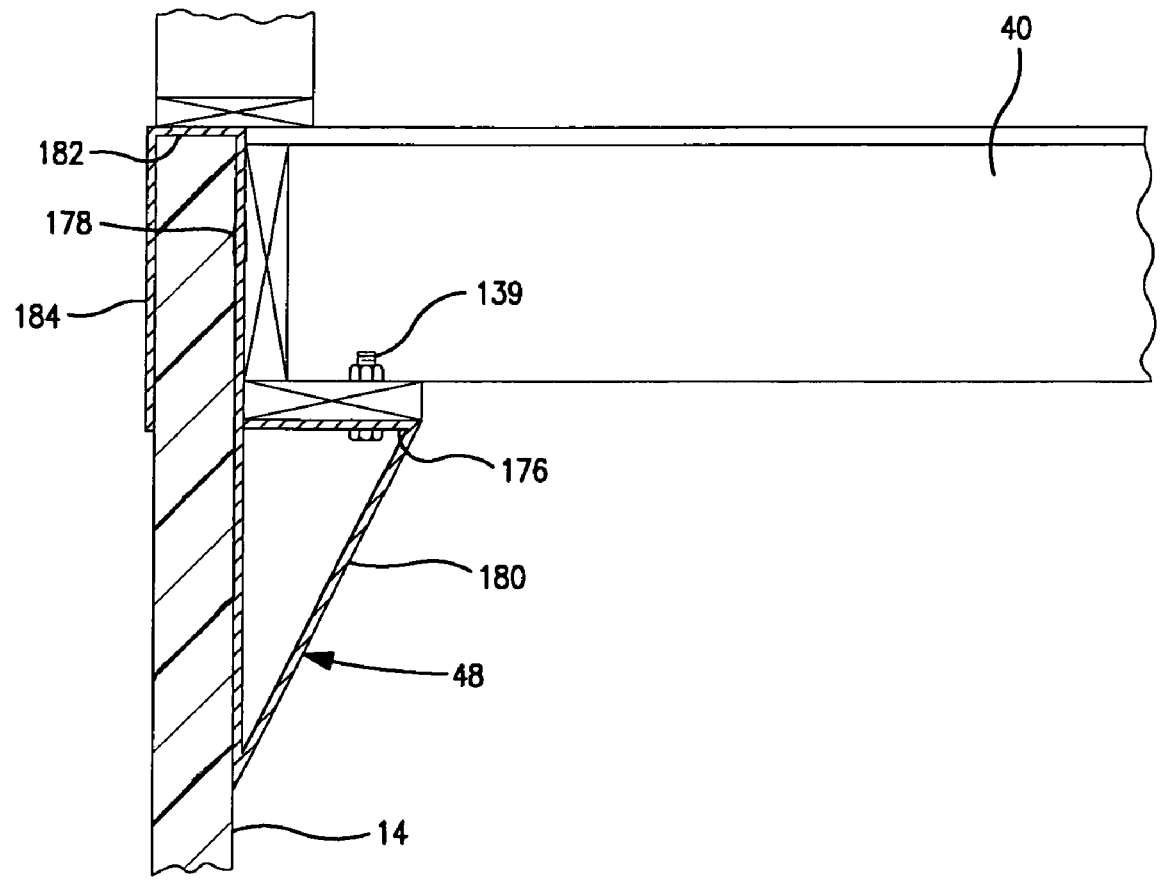
FIG. 6B is an enlarged view of a top portion of the structure shown in FIG. 6A.

As illustrated in FIGS. 6A, 6B, brackets 48, and correspondingly brackets 188, can be used to support the bottoms of the floor joists or other floor support members below the top of the wall such that the top of the floor 40 is at an elevation no higher than a height which is defined above the foundation wall a distance less than one time the height of the floor structure. In the embodiment shown, the top of the floor structure is at approximately the same elevation as the top of the foundation wall. The ends of the floor support members are disposed inwardly of the outer surface of the foundation wall and inwardly of inwardly-facing surface 25 of the foundation wall. The sub-floor and finished flooring, which overlie the floor support members, can extend beyond the floor support members as desired such as over panel 182 of bracket 48. Such lowering of the height of e.g. a ground floor can facilitate construction for handicapped entry into the building.

Similarly, brackets 48 can be configured to support the bottoms of the floor joists at any desired elevation below the top of the wall such that the top of the floor is at any corresponding elevation, e.g. at height intervals of 0.04 inch (1 mm), relative to the top of the foundation wall, up to a height which is about the same as the elevation shown in FIG. 6. Such configuring of brackets 48, 188 can thus be used to support floor joists corresponding to building floors which are above grade as well as building floors which are below grade. For example, where 2 floors of a building are below grade, brackets 48 can be so used to support floor joists or floor trusses on such below-grade floors, as well as on one or more above-grade floors.

While brackets 48 and 188 have been described herein as being used with building panels of the invention, brackets 48 and 188, when properly sized and configured, can be used with conventional e.g. concrete walls such as frost walls and foundation walls so long as upper panel 182 is sized to fit on such conventional wall.

Returning again to FIG. 6, bottom plate 16, as illustrated, can be a rather thin, e.g. about 0.18 inch to about 0.50 inch (about 4.6 mm to about 12.7 mm) thick, stiff and rigid resinous pultrusion which has sufficient stiffness and rigidity to spread the vertical load for which the panel is designed, out over substantially the full downwardly-facing surface area of the bottom plate, thus transferring the vertical load to the underlying e.g. aggregate stone, or other, fabricated base.

In some embodiments, an e.g. conventional concrete footer 55 (FIG. 3) is interposed between the natural underlying soil, or clean aggregate stone base, and the bottom plate 16. In such instance, any of a wide variety of conventionally available pliable, crushable, and curable liquid, paste, or the like deformable gasketing or other bridging material 51 of changeable form, or gasketing or other bridging material of defined but crushable form, such as sheet material, is laid down on the footer before the wall panel is placed on the footer. Bridging material 51 is illustrated as a somewhat irregular thick dark line between concrete footer 55 and bottom plate 16 in FIG. 3. The wall panel is installed over the intervening gasketing or other deformable material before the deformable material has cured, whereby the small interstices, spaces, between the footer and the wall panel are filled in by the deformable material.

When the deformable material cures, the deformable material becomes rigid, whereby the bridging material transfers corresponding portions of the overlying load across the potentially-existing spaces, which have been filled with the bridging material, thus to provide a continuous load sharing interface between the wall panel and the footer along the full length of the wall panel. Such bridging material can be any material sufficiently deformable to take on the contours of both the lower surface of plate 16 and the upper surface of the footer, and which is curable to create the afore-mentioned structural bridging configuration.

Referring again to FIGS. 3 and 6, concrete slab floor 38 is shown overlying that portion of bottom plate 16 which extends inwardly into the building from the inner surface 57 of wall panel 14, and inwardly from the studs 123. Slab floor 38 abuts the inner surfaces of wall panel 14 and studs 123, thus stabilizing the bottom end of the wall panel against inwardly-directed forces which reach the lower end of the wall panel. In some embodiments, bottom plate 16 extends only as far as the end panels 130 of studs 12

As desired, brackets 24, 24A, 24B can be further secured to studs 123 and/or main run wall section 22 by employing conventional fasteners such as screws or bolts through apertures 141 in base panels 134 or side panels 138 of the brackets.

Mechanical connecting structures such as bolts, screws, or brackets are spaced along the length of the wall, anchored in and extending from studs 123, or anchored in and extending from the main run portion of the wall panel, below the top of the concrete slab 38.

Another exemplary connecting structure is one or more lengths of reinforcing steel bar (rebar) or a fiber reinforced polymeric (FRP) rebar, which extends along the length of the wall panel, and through one or more of the studs and below the top of the floor slab. For example, a short bar can be used at each stud, extending out of each leg of the stud. Or a single bar can extend through one or more studs, or all of the studs in a given wall panel, whereby the length of the rebar generally corresponds to the length of the panel. The fluid concrete of the floor slab flows around such connecting structures before the concrete hardens such that the hardened concrete grasps such connecting structure, and is thus held to the connecting structure, thus preventing the concrete slab and the wall from pulling away from each other. FIGS. 6 and 6A illustrate such mechanical structure, e.g. a rebar, in end view at 143, extending from a stud and along the length of the panel.

As a combination structure, bracket 24B can be fabricated as a "U" shaped channel bracket, having base panel 134, top panel 136, and a bottom panel 147 opposing top panel 136. Such bracket is installed adjacent bottom plate 16 with base panel 134 oriented horizontally against bottom plate 16, with top panel 136 against inner layer 34, and with bottom panel 147 parallel to and spaced from top panel 136, whereby bottom panel 147 can serve the function of being grasped by floor slab 38.

While described using differing nomenclature, namely wall surface and inner surface, inner surface 57 and wall surface 25 both represent the same face of wall panel 14 when considered away from studs 123. Contrary to surface 25, inner surface 57 also includes the respective surface of the wall panel at studs 123.

Inwardly-directed forces which reach the upper end of the wall panel are opposed by the attachments between the overlying main floor 40 and top plate 20. Inwardly-directed forces which are imposed on wall panel 14 between the top of the wall panel and the bottom of the wall panel are transferred to the top and bottom of the wall panel through the stiffness and rigidity of the wall panel as collectively defined by the interactions of the structure defined by layers 34 and 36, intercostal webs 50, foam 32, and studs 123 if used. Other reinforcing structure can be included, added to the wall if and as desired in order to achieve the desired level of lateral strength and rigidity in the wall structure. Such loads are transferred to the slab floor 38 at the bottom of the wall by abutment of the concrete slab against the wall; and are transferred to the overlying floor at the top of the wall through brackets 24, 24A, 24B as applies, and bolts 139 where used, or through cap 342, top plate 20, and fasteners 362.

In residential construction, a typical maximum vertically-directed load experienced by an underlying e.g. foundation wall is about 3000 pounds per lineal foot to about 5000 pounds per lineal foot (about 4170 kg per lineal meter to about 7450 kg per lineal meter). The vertical load can be applied to the full width of the top of the wall anywhere along the length of the wall, including to studs 123.

Referring to FIG. 5, a typical wall panel of the invention, for use in single-family residential underground applications such as foundation walls, has a nominal thickness "T" of about 3 inches (7.6 cm). Studs 123, if used, for example as in FIGS. 5, 6 and/or 17, project away from the outer layer a distance of about 3.5 inches (8.9 cm) from inner surface 25 of the wall panel. Inner layer 34, outer layer 36, and reinforcing intercostals 50 are all about 0.09 inch (2.3 mm) thick. Studs 123 have walls about 0.09 inch (2.3 mm) thick. Foam 32 has a density of about 2.0 pcf (32 kg/m$^3$) to about 5 pcf (80 kg/m$^3$). Such typical wall panel has a vertical crush resistance capacity of about 15000 pounds per lineal foot (22,313 kg per lineal meter). The meter). The distance/depth by which studs 123 can extend away from the outer wall panel can vary from about 1 inch (2.5 cm) to about 10 inches (25.4 cm). The ratio of stud depth to stud width generally ranges from about 1/1 to about 3/1. Depth of less than 1 inch (2.5 cm) provides little in the way of either strength benefits or room for utility runs. At greater than about 6 inches (15.2 cm) depth, the absolutely greater widths of the studs suggest lesser value to the stud concept, compared to a thicker main run wall section.

Both the vertical crush resistance and the horizontal point loading bending moment resistance can be designed for relatively greater or lesser magnitudes by specifying, for example and without limitation, density of included foam; thickness of layers 34 and/or 36, and/or intercostal webs 50; wall thickness, spacing, and/or depth "T1" (FIGS. 5 and 17) of studs 123, or thickness "T" of the panel, or thickness "T" in combination with depth "T1" of the studs.

Panels expected to be used in below-grade applications are designed to satisfy the load requirements experienced in below-grade applications, while panels expected to be used in above-grade applications are designed to satisfy the load requirements experienced in above-grade applications. Such design process includes considering weather and/or ground movement history of the use location, as well as other environmental factors. Thus, building panels of the invention include a wide range of panel structures and properties, so as to provide engineered solutions which can be designed to fit the stress environments expected to be imposed on the specific building panels which are to be used in specific uses. One can, of course, also make building panels of generic design which are designed to tolerate a wide range of expected loadings. For example, a first design specification can be made to satisfy most below-grade uses while a second design specification can be made to satisfy most above-grade uses. Such standardization can reduce per unit processing costs, while accepting material costs which are excessive for many of the intended uses.

Given the conventional wisdom that concrete generally does not deflect before failing catastrophically, and that concrete is conventionally used in below-grade foundation walls, applicants believe that there is no universally-recognized standard regarding an allowable amount of lateral deflection of such wall under load.

Given that walls of the invention are made from FRP compositions, which can tolerate some deflection without catastrophic failure, one of skill in the art can predict that walls of the invention may deflect under rated load.

Figure 6C:
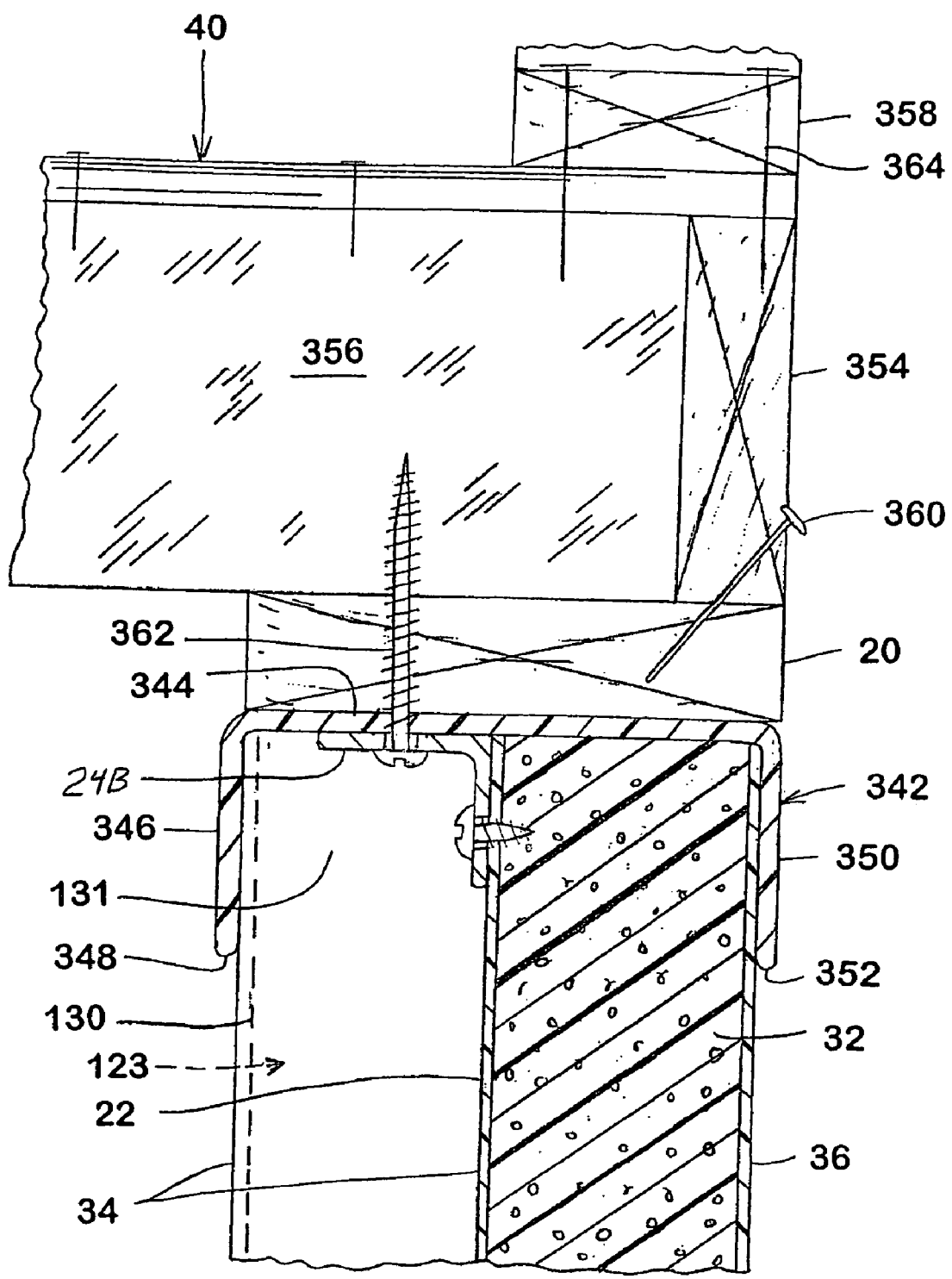
FIG. 6C shows an enlarged elevation view of a top portion of an alternative wall section, showing anchoring of the overlying building structure to the underlying wall structure.

FIG. 6C is another enlarged view embodiment of a top portion of another foundation wall structure. In the embodiment illustrated in FIG. 6C, the main run portion 22 of the wall panel is filled with foam as indicated at 32 and as generally shown in e.g. FIGS. 5 and 19. Inner layer 34 is on the inner surface of the foam. Outer layer 36 is on the outer surface of the foam. Inner layer 34 also extends about the plurality of upstanding studs 123 which are spaced along the length of the wall panel, and which extend, from the inner surface of the foam, away from the outer layer to end panels 130. In general, the wall panel 14 illustrated in FIG. 6C can represent any and all of the wall panels of the invention where studs 23, 123 extend, from the main run portion of the wall panel, away from outer layer 36.

Structural cap 342 covers the top of the wall panel, including the main run wall portion, the studs, and the utility cavities 131 between the studs, and extends downwardly over both the outer face of the wall panel and over the inner faces of the studs. Thus, cap 342 has a horizontal plate 344 which overlies and contacts the top of the wall panel. Horizontal plate 344 generally extends the full length of the wall panel, and extends from the outer surface of outer layer 36 to the exposed exterior surfaces of end panels 130 of studs 123. An inner flange 346 extends downwardly from the inner edge of horizontal plate 344 to a first distal end 348. An outer flange 350 extends downwardly from the outer edge of horizontal plate 344 to a second distal end 352.

Cap 342 is affixed to wall panel 14. A wide variety of methods can be used for such affixation. For example, the cap can be adhered to the wall panel at the respective interfacing surfaces using conventionally available construction adhesives. In the alternative, screws or other mechanical fasteners can be applied spaced along the length of the wall panel, e.g. through inner flange 346 and into studs 123, and through outer flange 350 and into the main run wall section, thus to anchor cap 342 to the underlying wall panel.

In the illustrated embodiment, top plate 20 overlies cap 342. Top plate 20 spreads the load of the overlying floor 40 and other structure over the entirety of the top plate 344 of cap 342.

Rim joist 354 overlies and bears on top plate 20, and extends along the length of top plate 20, cap 342, and thus along the length of the respective wall. A plurality of floor joists or floor trusses 356 are spaced along the length of top plate 20, and thus along the length of rim joist 354, and extend transversely from rim joist 354 into the building, thus to provide support for the overlying floor 40.

Overlying conventional wall plate 358 overlies floor 40. Wall plate 358 and its overlying structure, shown only in nominal part, represent the overlying walls which enclose the respective floor/story of the building along with all other building structure, and the associated loads, which ultimately bear on the foundation wall through floor 40, joists or trusses 356, rim joist 354, top plate 20, and ultimately cap 342.

Rim joist 354 is affixed to top plate 20 by a plurality of nails or screws 360 which are spaced along the length of the plate and rim joist. Wall plate 358 is screwed or nailed into the floor joists and rim joist e.g. by a plurality of screws or nails 364.

A plurality of anchor screws 362 extend upwardly in the utility run cavities/spaces 131 between the studs 123, through cap 342, through top plate 20, and into joists or trusses 356. Accordingly, the respective joists or trusses are typically offset from underlying studs 123 so as to facilitate vertical upward orientation of screws 362 into the respective joists or trusses. The threads on the screws bite into the material of joists or trusses 356, and thus provide direct anchor links, spaced along the length of the wall of the building, between the foundation wall 12 and the overlying floor whereby risk of movement of the overlying building structure off the foundation, e.g. in the face of extreme environmental stresses, is substantially diminished. Screws 362 are readily applied/inserted after erection of the foundation wall because of the availability of cavities 131 between the studs.

Where a space is available within the overlying structure, such as above the bottom stringer of a floor truss, vertically upwardly extending bolts can be used in place of the vertically upwardly extending anchor screws, and nuts and optional washers can be used on the bolts, thereby to secure the truss or other overlying structure to the underlying wall. Other vertically upwardly directed mechanical fasteners such as nails can be used in place of the recited and illustrated screws, so long as the respective fasteners provide the desired level of securement between the overlying structure and the underlying wall. In the illustrated embodiments, cavities 131 provide access through the bottom of the cap for application of such fasteners into joists or trusses 356. Other access cavities may be provided as desired, in addition to or in place of cavities 131, for the purpose of providing driving access for driving fasteners through the cap and into the overlying structure.

The specifications for cap 342, other than the cross-section profile, are generally the same as for bottom plate 16. Thus, a cap which is a pultruded structure e.g. 0.09 inch (2.3 mm) to about 0.5 inch (12.7 mm) thick is generally satisfactory for general-purpose use in typical single-family residential, light commercial, and light industrial construction. In any event, cap 342 is sufficiently thick, dense, and rigid to provide effective compression and bending support, thus to spread the weight or other loads of the overlying building structure over the top end of, and onto, the wall panel, including onto the main run wall section and onto studs 123.

Cap 342 can, in the alternative, be made of overlapping layers of fiberglass, impregnated with a curing resin, and subsequently cured, as discussed herein with respect to bottom plate 16.

Still referring to FIG. 6C, in some embodiments, top plate 20 can be omitted, whereby cap screws 362 extend from cap 342 directly into joists or trusses 356; and nails or screws 360 extend from rim joist 354 directly into cap 342, optionally with starter holes being previously fabricated in the rim joist and cap. In such embodiments, cap 342 performs the function recited above for the cap, as well as the functions typically performed by top plate 20.

In the alternative, cap 342 can be omitted, top plate 20 can be secured directly to the underlying panel, and screws 362 extend through top plate 20 and into the overlying floor structure. One way of securing the top plate to the wall panel is to position a bracket 24B in the corner defined by panel 14 and top plate 20 such that one flange of the bracket is against the inner surface of the wall panel and the other flange is against the top plate. Screws through the respective flanges thus secures the top plate to the wall panel.

Figure 6D:
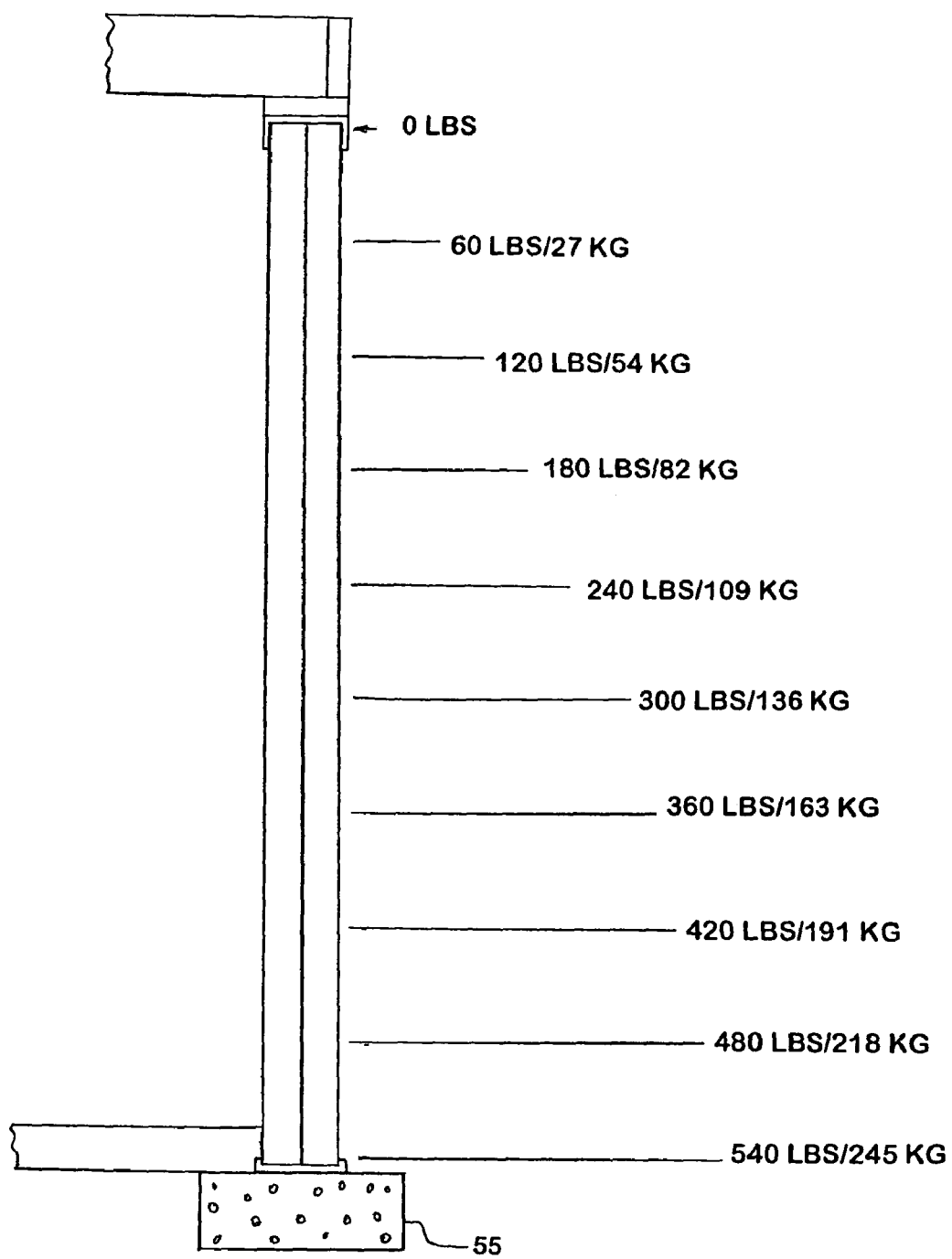
FIG. 6D is a representative elevation view, similar to FIG. 6, showing typical relative lateral soil loading on a wall.

FIG. 6D illustrates a wall like that of FIG. 6, with lateral soil force vectors applied at 1-foot (0.3 m) intervals along the height of the wall. FIG. 6E illustrates the same lateral soil forces in table form for three different wall heights, for each of three different soil types.

In developing wall panels and walls of the invention, the inventors herein have determined that acceptable lateral deflections in wall panels of the invention are generally related to the overall height of the wall for a given floor of the building, according to the formula $H/240$=maximum allowable deflection, where "H" and the allowable deflection are both expressed in the same unit of measure.

For example, a foundation wall having a height of 9 feet/108 inches (2.7 m) has a maximum acceptable deflection calculated as follows:

108 inches/240=0.45 inches maximum allowable deflection (274.3 cm/240=1.14 cm maximum allowable deflection)

EXAMPLE

Walls made according to this invention can readily satisfy the above deflection standard, given the following specification:

| | |
|---|---|
| Panel height | 108 inches (2.7 m) |
| Overall thickness | 6.88 inches (17.5 cm) |
| Thickness, main run wall section, incl layers 34 and 36 | 3.25 inches (8.3 cm) |
| Stud depth | 3.63 inches (9.2 cm) |
| Thickness of layers 34, 36 | 0.09 inch (2.3 mm) |
| Thickness of stud side walls and end panels | 0.09 inch (2.3 mm) |

Glass specification as described hereinafter with respect to FIG. 5A.

Applicants have surprisingly discovered/observed that, when upright walls and wall panels made according to the above specification are subjected to top/compressive loads which are evenly distributed from outer layer 36 of the main run wall section to end panels 130 of the studs, such walls and wall panels deflect outwardly of the building, toward outer layer 36, 236, namely toward the soil back fill. Thus, the natural horizontal/lateral soil loading applied by the backfilled soil, is at least in part countered by opposing forces resultant from the compressive building load. As the wall deflects against and toward the backfilled soil, that portion of the compressive/gravity load of the building which is expressed outwardly is thus dissipated in the adjacent backfilled soil. Thus, the outward wall deflection, resulting from the overlying building load, balances out some or all of the inwardly-directed horizontal soil loading on the wall. As a result, these opposing lateral forces on the wall tend to balance each other out, thereby leaving a relatively lower resultant horizontal load on the foundation wall. While the inwardly-directed soil loading can be calculated as in FIG. 6E, the magnitude of the outwardly-directed building load depends on the overlying building structure as well as on the structure of the wall panels and walls.

While choosing to not be bound by theory, the inventors herein contemplate that such outward deflection may be a result of the load centerline "C/L" (FIG. 5) along the horizontally-measured length of the upright wall panel, being spaced inwardly into the building from inner layer 34, from inner surface 25. Given a general balancing of strengths per lineal foot in inner layer 34, outer layer 36, stud legs 128, and stud end panels 130, the load-bearing capacity of studs 123 may be less than the load-bearing capacity of the main run wall section, whereby studs 123 may compress to a greater degree than the main run wall section, which greater stud compression would translate to an outward deflection of the wall toward the soil back fill.

Thus, it would appear that such outward wall deflection can be expected any time the centerline of the load balance overlies cavity 131 and the load capacities of the stud skin layers approximate the load capacities of inner and outer layers 34, 36.

Returning to FIG. 1, as suggested above, conventional steel I-beams can be used in combination with wall panels 14 of the invention. As illustrated in FIG. 1, such I-beams are supported from the underlying soil at conventional spacings by posts 28 which transmit loads from the I-beam to the underlying soil, through a load-spreading pad 30. In conventional structures, the load is transmitted by a conventional steel post, to an underlying footer pad of concrete which is poured on the underlying soil.

In the invention, in the interest of avoiding need of a ready-mix truck for small loads, thus in place of a concrete footer, multiple layers of reinforced polymer composite are used in fabricating a support pad 30. A typical such support pad 30 is illustrated in FIG. 7, underlying a support post and supporting a structural floor-support beam 26.

Figure 8A:
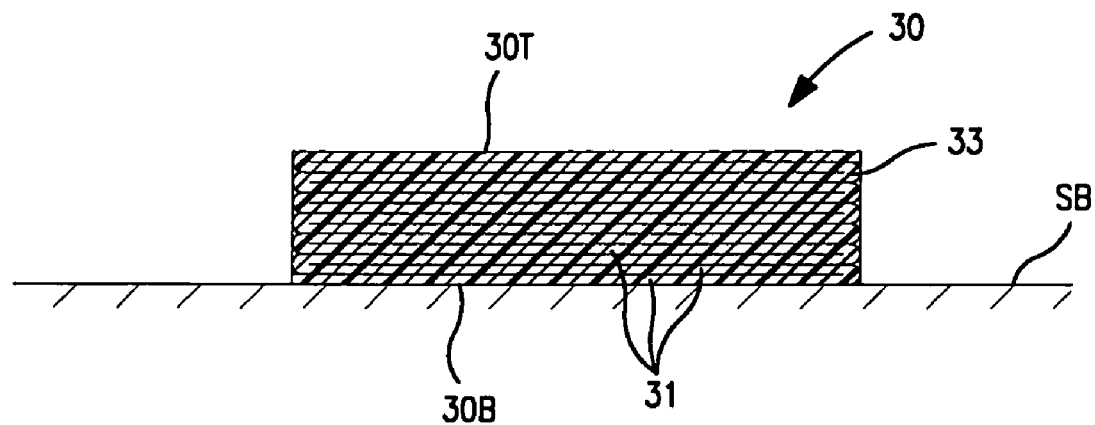
FIG. 8A is a cross-section of a layered support pad illustrated in FIG. 7, shown on an underlying rock or earth support base.

A cross-section of a representative pad 30, on an underlying support base SB is illustrated in FIG. 8A. As illustrated in FIG. 8A, pad 30 has an upwardly-facing top 30T and a downwardly-facing bottom 30B. The surface area of the bottom of the pad is selected to be large enough to spread the overlying load over enough of the natural soil and/or rock underlying support base that the underlying support base can support the overlying load over a generally indefinite period of time without deleterious deformation or flow, whether vertical flow or transverse flow, or other movement of the underlying support base. The pad is constructed of a plurality of generally-extending ones of fiberglass-reinforced polymer composite layers 31. The layers are, in general, positioned such that at least a substantial portion of a relatively overlying layer overlies a substantial portion of a relatively underlying layer. Typically, the layers are stacked one on top of the other, optionally connected to each other at the edges 33, as by folding one layer into a next-adjoining upper or lower layer, such that the respective stacking of the layers, layer on layer, results in facing, generally horizontally disposed, portions of the respective layers supporting each other, and acting collectively, thus to provide pads having sufficient bending resistance to bear downwardly-directed loads when the pads are in use.

Such layering can be created by folding and stacking a resin-wetted fiberglass layer in a wet mold, closing the mold and evacuating the air, thus to consolidate the pad, then curing the resin, resulting in the hardened fiber-reinforced polymeric pad. In the alternative, the fiberglass layering can be placed in a dry mold in dry condition, and the resin can be infused into the mold while the mold is being evacuated.

Figure 7:
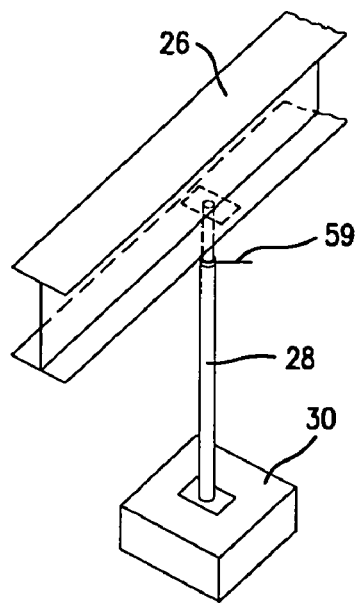
FIG. 7 is a fragmentary pictorial view showing a basement support pad of the invention, supporting a conventional support post which supports an I-beam as in a below-grade basement location.

Pad 30 is illustrated in FIG. 7 as having a generally square or round projected area, and as being used for spot support such as in support of a post 28. Pad 30 can have an expanded projected area of any desired projected configuration such that a single pad underlies and supports multiple posts in an area. Further, pad 30 can have an elongate configuration whereby pad 30 can be used as an elongate footer under, and supporting, any number of foundation panels 14 when such panels are used in a fabricated foundation wall.

Thus, a typical support pad can have a projected area of about 1 square foot (0.09 m$^2$) to about 10 square feet (0.9 m$^2$) when designed to support a point load such as a single post. A pad which is designed to support an e.g. elongate load such as a wall having a length of e.g. 10 feet (3.05 m), 20 feet (6.1 m), 40 feet (12.2 m), or more has an elongate dimension corresponding in magnitude to the length of the wall.

The thickness of the pad is designed to support the magnitude of the anticipated overlying load. Thus, as with the building panels, for each building application, the pad represents an engineered solution based on the anticipated load and load distribution. Magnitude of the load as supported by pad 30 generally corresponds to the load distribution conventionally contemplated for typical single-family residential construction. Thus, the load distribution recited herein for foundation walls can apply such that an elongate pad can support at least 5000 pounds per lineal foot (7500 kg/lineal meter) and a round or square pad can support loads of at least about 2000 to about 5000 pounds per square foot (about 9760 to about 24,400 kg/m$^2$), more typically at least 3000-5000 pounds per square foot (about 14,640 to about 24,400 kg/m$^2$). Higher loadings can be supported by suitably engineered such pads.

The thickness of a pad, between top 30T and bottom 30B depends in part on the load magnitude and load distribution, and in part on the specific resin as well as the specific structure of the reinforcing fibers and fiber layers, as well as on the nature of the construct of the pad. For light-weight construction, where the pad carries a relatively lighter load, the thickness of the pad can be as little as 1 inch (2.5 cm) thick. Where the pad bears heavier loads, the pad is thicker, and has generally the same order of magnitude of thickness that would have been used if the material were steel-reinforced concrete. Thus, pad thickness typically ranges from about 3 inches (7.6 cm) thick to about 16 inches (40.6 cm) thick, optionally about 6 inches (15.2 cm) thick to about 16 inches (40.6 cm) thick, optionally about 8 inches (20.3 cm) thick to about 16 inches (40.6 cm) thick, with all thicknesses between 1 inch (2.5 cm) and 16 inches (40.6 cm) being contemplated. Thicknesses less than 3 inches (7.6 cm) and greater than 16 inches (40.6 cm) are contemplated where the anticipated vertical load and load distribution, along with the material properties, indicate such thicknesses.

In general, the dimension of thickness is less than either the length or width dimension. As illustrated in e.g. FIG. 1, typically the magnitude of the thickness dimensions is no more than half as great as the magnitude of the lesser of the length dimension or the width dimension.

In any event, the structure shown in FIG. 8A is not limiting as to the layer structuring. For example, the layers of fiberglass can be configured as an elongate roll, where relatively outer layers are wrapped about one or more relatively inner or core layers.

Figure 8B:
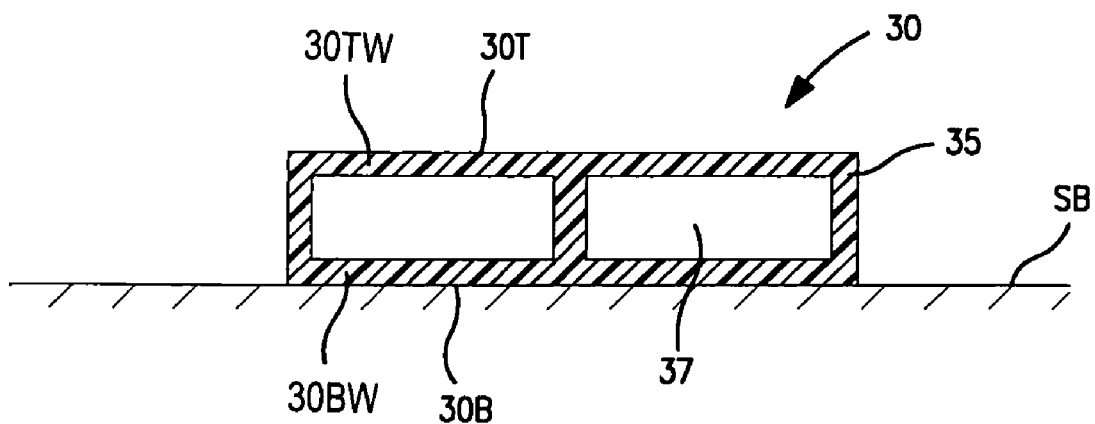
FIG. 8B is a cross-section of a pultruded support pad illustrated in FIG. 7, shown on an underlying rock or earth support base.

In the alternative, as illustrated in FIG. 8B, pad 30 can be a pultruded fiberglass-reinforced polymeric structure such as a solid pultruded plate or a rectangular tube positioned such that one or more cavities 37 extend generally horizontally through the structure. Such rectangular tube has a generally horizontal top or inner web 30TW, a generally horizontal bottom or outer web 30BW, and one or more generally upstanding connecting webs 35 which support the top web from the bottom web. In the embodiment illustrated in FIG. 8B, cavities 37 are hollow. In other embodiments, a honeycomb or other web structure extends the length of the cavity 37, thus providing bridging structure between top web 30TW and bottom web 30BW, which can provide structural support supporting the top web from the bottom web and thereby take on some of the support function of connecting web or webs 35.

The post 28 is generically represented in FIG. 1. While post 28 can be steel, and pad 30 can be concrete where wall panels of the invention are used, the invention contemplates that post 28 is a hollow fiberglass-reinforced polymer composite structure. Curing resin as in the pad and building panels can be used to mount and bond post 28 to the pad, with conventional shimming as desired.

Such resin-fiber composite post 28 has a generally enclosing structural sidewall. The post sidewall is made of fiberglass-reinforced polymer composite or other fiber reinforced resinous structure. The thickness and rigidity of the post sidewall is designed as known in the art to carry a specified load, thereby to support the weight of an overlying portion of typically an above-grade structure, though below grade structures can be supported as well. The enclosing post sidewall defines an interior chamber disposed inwardly of the enclosing sidewall. The interior chamber is typically empty, but can contain structural or non-structural material as desired.

Where a fiberglass post 28 is used, a fiberglass-reinforced polymer composite cap 58 is typically mounted over the top of the post. Cap 58 has a top wall 60, and one or more downwardly-depending structural skirts 62. Top wall 60 of the cap is sufficiently thick and rigid to receive the load from the overlying beam and transmit the load generally uniformly about the perimeter of the upstanding outer wall or walls of the post, including where the outer walls may be disposed laterally outwardly from the edges of the beam. The structural skirt or skirts are configured such that, when the cap is mounted on the post, with the top wall of the cap bearing down on the top of the post, the inner surface of the structural skirt or skirts is/are in generally surface-to-surface contact with, or close proximity with, the outer surface of the post, such that the skirt structure receives and absorbs typically-encountered lateral forces and transfers such lateral forces to the sidewall of the post, thereby preventing the top of the cap from moving laterally relative to the top of the post.

The cap distributes the lateral loads to the post side walls with limited bending of the top wall of the cap, so as to utilize the load-bearing capacity of the post sidewalls, from at or near the upper edge of the post, along the full height of the post to the underlying pad 30. The cap skirts thus capture lateral forces and transfer such lateral forces to the post.

An alternative to cap 58 is to use a conventional adjustable screw 59 on the top of post 28. Such screw 59 can be used in place of cap 58, or in combination with cap 58, e.g. between cap 58 and overlying beam 26. Where both cap 58 and screw 59 are used, a suitable screw/cap interface is configured in the screw and/or cap to ensure suitable cooperation of the cap and screw with respect to each other.

Figure 9:
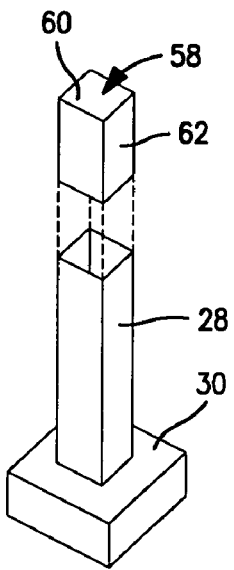
FIG. 9 is a pictorial view of a square resin-fiber composite support post, and resin-fiber composite cap, of the invention, supported by a square resin-fiber composite support pad of the invention.
Figure 10:
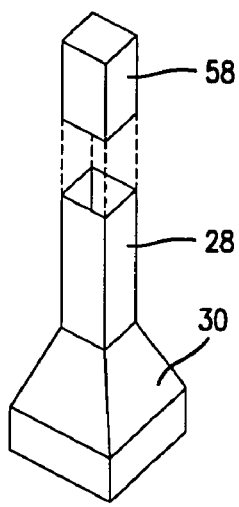
FIG. 10 is a pictorial view of a square resin-fiber composite support post, and resin-fiber composite cap, of the invention, supported by a square resin-fiber composite, upwardly-tapered support pad of the invention.
Figure 11:
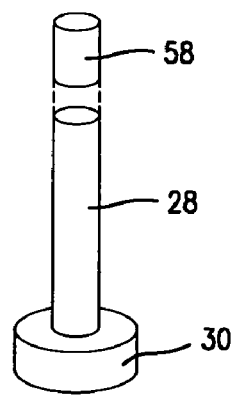
FIG. 11 is a pictorial view of a round resin-fiber composite support post, and resin-fiber composite cap, of the invention, supported by a circular resin-fiber composite support pad of the invention.
Figure 12:
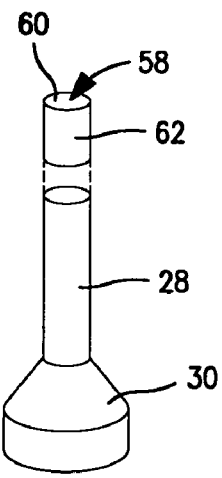
FIG. 12 is a pictorial view of a round resin-fiber composite support post, and resin-fiber composite cap, of the invention, supported by a circular, upwardly-tapered resin-fiber composite support pad of the invention.

FIG. 9 illustrates a square fiberglass-reinforced polymer composite pad 30 of the invention, a square fiberglass-reinforced polymer composite post 28 of the invention, and a square fiberglass-reinforced polymer composite cap 58 of the invention. FIG. 10 illustrates a pad/post/cap combination similar to that of FIG. 9 but where the pad is tapered from the top of a base of the pad upwardly to where the pad meets the post. FIG. 11 illustrates a pad/post/cap combination similar to that of FIG. 9 but where the post, the pad, and the cap are circular. FIG. 12 illustrates a pad/post/cap combination similar to that of FIG. 11 but where the pad is tapered from the top of a base of the pad upwardly to where the pad meets the post.

While the pad/post/cap combinations shown in FIGS. 9-12 can be used on the interior of the building such as in a basement post arrangement as suggested in FIG. 1, a primary purpose of the invention, of avoiding the need to bring a ready-mix concrete truck to the construction site, is advanced by using pad/post/cap combinations such as those illustrated in FIGS. 9-12 in applications outside the foundation of the building, such as to support a deck, a porch, a patio, a light post, or other appurtenance. In such application, the pad and post are set in the ground below the frost line. The post is then cut off typically, but not necessarily, below grade. Conventional structure such as a 4×4 treated wood post is then mounted to the top of cap 58, and the cap is subsequently mounted, e.g. adhesively mounted, to the top of the post, with the cap skirt extending below the top of the post. With the e.g. 4×4 post thus extending upwardly from the cap, with the cap permanently e.g. adhesively mounted to the post, the hole is filled to grade such that only the conventionally-used wood post remains visible. Thus, typical outside appurtenances to the building can be completed, again without any need to bring ready-mix concrete, or concrete block, to the construction site, and with only conventional materials being visible above the finished grade. This can provide a significant time and cost advantage when only a small amount of concrete would have otherwise been needed, as the trucking cost is fixed, even for a small quantity of ready-mix concrete.

In other embodiments, the fiberglass post 28 can extend above finished grade, and can support any of a wide variety of suitable overlying structures from above-grade joinders.

As indicated above, one of the objectives of the invention is to use wall panels and accessory structure in places, and for structural purposes, where concrete would conventionally be used. Use of concrete in foundation walls is common, and the products of the invention are readily adapted to be used in foundation structures.

In some conventional implementations of buildings in areas with substantial seismic activity, reinforced concrete has been used in the building foundation. However, even when heavily reinforced with steel, concrete can crack and crumble during seismic activity. By contrast, walls and wall panels of the invention, engineered to the same or similar load-bearing requirements successfully withstand/tolerate substantially greater seismic loading before structural failure. In any event, walls of the invention do not crumble, or rack.

Where e.g. seismic activity imposes substantial side loads, extending along the length of the wall, a conventional concrete wall cannot deflect, but will instead crumble. Such loads on wood frame walls cause such wood frame walls to rack, e.g. to convert from rectangles to something resembling parallelograms. By contrast, walls of the invention can deflect outwardly, optionally inwardly, but are not substantially racked by seismic activity, do not crumble, and can withstand greater such side loads than typically-used concrete structures.

In more tropical climates, above-ground outside walls are, in some instances, required to be built with concrete for the purpose of, among other advantages, inhibiting mold growth. Where high wind conditions, such as hurricanes or tornadoes, are common, above-grade outside walls are, in some instances, required to be built with concrete in order to achieve a level of lateral strength, against perpendicularly-directed wind and rain forces, which can withstand such forces.

In such situations, such as in areas frequented by hurricanes or tornadoes, above-ground wall structures of the invention can be used in place of concrete, while achieving the lateral strength which can withstand such forces, and at the same time avoiding the e.g. water penetration, and other, limitations inherent in concrete. Accordingly, the wall structures of the invention are contemplated to be useful in above-ground applications as well as below-ground/foundation wall applications.

The Fiber

The reinforcing fiber materials used in pultruded products of the invention can be selected from a wide variety of conventionally available fiber products. Glass fiber has been illustrated in the general description of the invention, and is believed to be the most cost effective material. Other fibers which are contemplated as being acceptable include, without limitation, carbon fibers, Kevlar fibers, and metal fibers such as copper and aluminum. Other fibers can be selected to the extent their reinforcing and other properties satisfy the structural demands of the building panel applications contemplated in the invention, and so long as the fibers are not pre-maturely degraded in the use environment contemplated for the respective wall panels.

To that end, use of cellulosic fibers is limited to those compositions where the cellulosic fiber can be suitably protected from the deleterious affect of moisture reaching the fiber and degrading the fiber. Thus, use of cellulosic fiber without moisture protection in the invention is generally limited to less than 10 percent by weight of the overall composition of a given structural element, e.g. panel, bracket, or the like. However, where the fiber is impregnated with a suitable quantity of resin, and the resin protects the cellulosic fiber from attack by moisture, such composite compositions can be used at concentrations greater than 10 percent by weight cellulosic fiber.

The lengths, widths, and cross-sectional shapes of the fibers are selectable according to the structural demands of the structures in which the building panels or other structures are to be used. Similarly, the structures of the fiberglass manufactured products which are incorporated into the panel can be selected according to the structural demands which will be placed on the panels. Those skilled in the art are capable of making such selections.

FIG. 5A provides a representative example of a glass schedule which can be used to make panels useful in exterior wall construction as described elsewhere herein. FIG. 5A shows the fiberglass layers/elements disposed about foam blocks 232 in the main run wall section of the panel and about foam blocks 232A in studs 123.

Starting from the outside of the panel, the outermost layer of fiberglass is a ½ ounce per square foot (128 $g/m^2$) glass surface veil 260. Inwardly of the surface veil are first and second layers 262, 264 of 18 ounce per square yard (612 $g/m^2$) unidirectional rovings each with a 1 ounce per square foot (255 $g/m^2$) chopped strand mat, wherein the chopped strand mat is in each instance disposed outwardly of the rovings, toward outer veil 260. Thus the fiberglass in outer layer 236 of the panel is defined by fiberglass layers 260, 262, and 264.

The fiberglass at intercostals 250 is a series of 18 ounce per square yard (612 $g/m^2$) rovings 266, with 1 ounce per square foot (255 $g/m^2$) chopped strand mat 268 disposed on each side of the rovings between foam blocks 232 and the rovings.

An intumescent veil 270 of fiberglass mat coated with intumescent material is the innermost fiberglass layer in the panel. An intumescent material is a material which swells, enlarges, or bubbles up, and typically chars when exposed to flame and forms an insulating fire-retardant barrier between the flame and the material/substrate which bears the intumescent material. A suitable intumescent material is available as TSWB powder from Avtec Industries, Hudson, Mass. The TSWB powder can be added to a fiberglass veil by e.g. dispersion coating.

In the alternative, the intumescent material can be added to the resin which will form the innermost layer of the panel.

Next inwardly of intumescent veil 270 is a layer 272 of 24 ounce per square yard (816 $g/m^2$) unidirectional rovings with a 1 ounce per square foot (255 $g/m^2$) chopped strand mat 274 disposed between the rovings and the intumescent veil.

On studs 123, next inwardly of layers 272 and 274 is a layer 276 of 24 ounce per square yard (816 $g/m^2$) rovings, extending along the legs 128, and the end panels 130, of the studs adjacent foam blocks 232A.

Between layers 270, 272 and 274, and foam blocks 232, is a layer 278 of 18 ounce per square yard (612 $g/m^2$) unidirectional rovings with a 1 ounce per square foot (255 $g/m^2$) chopped strand mat 280 between rovings layer 278 and rovings layer 274, with rovings layer 278 and chopped strand mat layer 280 being disposed between foam blocks 232 and 232A at studs 123. Thus the fiberglass in inner layer 234 of the panel is defined by fiberglass layers 270, 272, 274, 278, and 280.

Referring again to FIG. 5A, in each stud, one of the legs 128 is aligned with one of the intercostals 250, such that a load transmitted through the respective intercostal is readily transmitted into the respective leg 128 of the adjacent stud.

Now that a specific glass schedule has been illustrated for an exemplary wall panel, those skilled in the art can readily devise other glass schedules to meet the needs of other implementations of the invention.

The Polymer

The polymer which is used in the pultrusion process, and optionally used as an adhesive for joining elements of the structure to each other, can be selected from a wide variety of conventionally available multiple-part reaction-curing resin compositions and thermoplastic resin compositions. Typical reaction curing resin is a 2-part liquid where two liquid parts are mixed together before the resin is applied to the fiber substrate. Third and additional components can be used in the reaction mixture as desired in order to achieve the desired level of reaction curing of the resin, as well as to achieve desired properties in the cured resin. The resin mixture should be sufficiently liquidous to be readily applied and spread about a fiber base sheet/substrate thereby to fill in all of the voids in the substrate and/or to so flow over, under, around, and through the fiber composite in a forming and/or molding process. Examples of useful 2-part reaction curing resins include, without limitation, epoxy resins, vinyl ester resins, polyester resins, polyurethane resins, and phenolic resins. Examples of thermoplastic resins include thermoplastic polyurethanes, acrylics, polyethylenes and other polyolefins. Resin used in pultrusion can also be thermoplastic resins which are embedded in rovings which melt and form the part in the pultrusion die.

Those skilled in the art know that each of the above noted reaction curable resins represents a large family of reactable materials which can be utilized to make the resultant reaction-cured pultruded resin structure, and are capable of selecting reaction resin combinations for the uses contemplated in the invention. Suitable reaction curable experimental resin is a polyester resin available as XV 2979 from AOC Manufacturing Company, Collierville, Tenn. In addition, more than two such resins can be mixed to obtain a desired set of properties in the reaction product or process.

Another suitable resin is an acrylic resin available as MODAR from Ashland Inc., Covington, Ky.

The resin, whether reaction curable or thermoplastic resin, can be modified by addition of filler to the polymeric composition, in the amount of up to about 200 parts filler by weight to each 100 parts polymer, optionally 30 parts filler to about 100 parts filler per 100 parts polymer, optionally about 40 parts filler to about 60 parts filler per 100 parts polymer. About 50 parts filler to 100 parts polymer has been found to be highly satisfactory. While a variety of fillers can be used for the purpose of reducing cost of the resin component of the resultant panel, alumina trihydrate powder, as conventionally available as polymeric filler, has been found quite satisfactory in that the alumina trihydrate satisfies the objective of cost containment while adding a level of fire retardancy. Suitable alumina trihydrate is available from Huber Engineered Materials, Atlanta, Ga.

For any set of reaction materials or thermoplastic resins which are used in the invention, any conventional additive package can be included such as, for example and without limitation, catalysts, anti-oxidants, UV inhibitors, fire retardants, fillers, intumescent material, fluidity-control agents, whether organic, inorganic, or polymeric, to enhance the process of applying the resin and/or curing the resin, and/or to enhance the properties of the finished product such as weather resistance, fire resistance, hardness, shrink control, mold lubrication, colorants, fillers, and other desired features.

Each set of two or more materials which can be mixed and reacted to make the resultant resin product, or each thermoplastic composition, has its own processing parameters, such as reaction temperature, catalysts, time required for a curing reaction to take place, extruder temperature, die temperature, and the like, along with respective processing equipment with which the respective resin is effectively processed. Further, each set of such two or more reaction materials, or each thermoplastic resin composition, develops its own set of resultant physical and chemical properties in light of the curing or plasticizing, and molding process. Especially the physical properties are influenced by the affect of the included fibers and fillers, such that more than two such reactants, or two or more thermoplastic resins, may be useful in achieving, in the finished polymer, a desired set of physical properties.

The Polymer/Fiber Composite

In general, dry fiber strands are used as the fiber base for a pultrusion process. E.g. dry fiber substrate, woven cloth, fiber mat and/or rovings are used for structural elements of the invention other than wall panels, such structural elements as posts, 28, pads 30, caps 58, and any of brackets 48, 160, and 188. Where using other than a pultrusion process to form a structural element, enough resin is added to the fiber substrate to fill all voids, whereby there should be no air inclusions, or so few air inclusions as to have no material affect on the physical or chemical stability, or the physical properties, of the structural element being fabricated. Overall, the glass/resin ratio is as high as can be achieved while not leaving any significant, deleterious voids in the resultant structural element once the resin is cured.

Given the requirement to minimize voids, and using conventional layer-development techniques, the resultant structural layer product, e.g. layer 34 or 36, or intercostals 50, or other product, is about 30 percent by weight to about 65 percent by weight fiberglass, and correspondingly about 70 percent by weight to about 35 percent by weight resin. Optionally, the resultant layer is about 40 percent by weight to about 60 percent by weight fiber and about 60 percent by weight to about 40 percent by weight resin. A typical resultant cross-section is about 45 percent by weight to about 55 percent by weight fiberglass and about 55 percent by weight to about 45 percent by weight resin, optionally about 50 percent by weight fiberglass and about 50 percent by weight resin. Where filler is used, the weight of the filler, as well as all other resin additives, is taken to be part of the above-recited resin fraction.

According to well-known technology, the number of layers of glass, in combination with the weight of the glass per layer, in general determines the thickness of the resultant layer after the resin-impregnated layer is cured. For example, multiple layers of a 12-30 ounce per square yard (407-1016 g/m$^2$) layer of woven fiberglass cloth can be impregnated to fill all voids, and to thereby achieve a resultant cured structure which is typically between about 1 millimeter thick and about 12.7 millimeters thick (between about 0.04 inch thick and about 0.50 inch thick). The greater the number of layers of fiberglass which are impregnated, typically the greater the thickness of the resulting impregnated and cured composite reinforced layer.

Referring to wall panels 14 wherein studs 123 are in an upstanding e.g. vertical orientation, the reinforcing fiberglass fibers are predominantly oriented to extend in an upright direction, e.g. up and down, parallel to the studs. Transverse fibers and/or adjacent layers having transverse fibers, can be used to bond together the upright fibers, thus to provide a relatively lesser degree of strength contributed by the transversely oriented fibers and to fix the lateral locations of the upright fibers.

The bottom plate can be any material which can bear the load imposed on the overlying wall panel. A typical bottom plate is an e.g. about 0.18 inch thick to about 0.50 inch (about 4.6 mm to about 12.7 mm) thick fiber-reinforced pultrusion, which is sufficiently stiff and rigid to spread the overlying load to the underlying soil substrate along the length of the panel through an e.g. leveled clean aggregate stone base. The stone may be a crushed stone or an uncrushed aggregate stone.

Top plate 20 can be made of, without limitation, fiberglass-reinforced, or other fiber-reinforced, resinous materials, including fiberglass reinforced pultrusions, or other materials such as wood, in the shape conventionally used for a top plate, or in a novel shape such as that illustrated at 342. It is contemplated that a conventional wood-based top plate serves the purpose adequately, and provides for attachment of overlying wood elements such as wood framing, using conventional fasteners and conventional fastening methods.

The Foam

The purpose of foam 32 can be two-fold. First, the foam can contribute to the structural integrity and strength of the building panel structure by being sufficiently rigid, namely a rigid foam, and sufficiently affixed to the adjacent panel elements, that the foam contributes significantly to fixing the structural layers 34 and 36, and intercostal webs 50, in their designed configurations under normal loading of the panel, whether vertical gravitational loading, or lateral loading such as lateral ground loads in below-grade applications, and lateral wind and/or water loads in above-grade applications. Thus, the foam can make a substantial contribution to the dimensional stability of panel 14.

Second, the foam contributes a substantial thermal insulation property to the resulting building panel construct.

In achieving a desired level of thermal insulation while retaining the foam as a rigid closed-cell material, the foam has a density of about 1 pound per cubic foot (pcf) (16 kg/m$^3$) to about 12 pcf (192 kg/m$^3$), optionally about 2 pcf (32 kg/m$^3$) to about 8 pcf (128 kg/m$^3$), optionally about 2 pcf (32 kg/m$^3$) to about 5 pcf (80 kg/m$^3$). Lighter weight foams can be used so long as the desired level of thermal insulation is achieved. While heavier weight foams can be used, and typically provide a greater increment of structural strength, certain heavier weight foams may provide less than the desired level of thermal insulation properties, and are more costly. In general, the foams used in the invention are relatively lighter weight closed-cell foams.

Foam 32 can be made from a wide variety of compositions including, without limitation, extruded polystyrene foam, expanded bead polystyrene foam, rigid urethane foam, phenolic foam, or polyisocyanurate foam. The foam is moisture resistant, preferably moisture proof, and is chemically and physically compatible with the compositions and structures of layers 34 and 36, and intercostal webs 50. A suitable foam board is 2 pounds per cubic foot (32 kg/m$^3$) polyisocyanurate foam, available from Elliot Company, Indianapolis, Ind.

Foam 32 optionally fills all, or substantially all, of the spaces between the respective surfaces of structural layers 34 and 36, and intercostal webs 50, and is in surface-to-surface contact with the respective layers and intercostals as such layers define the cavities in which the foam is received. In addition, the foam is adhered to the respective structural layers and intercostals so as to absorb sheer forces between the foam and the respective structural layers and intercostals.

Blocks 32 of foam can be brought into surface-to-surface relationship with the fiberglass and resin as part of the pultrusion process while the pultrusion profile is being formed and pultruded and before the resin has set, whereby the foam is in surface-to-surface contact with the respective layer precursors and becomes wetted with the uncured/plastified resin. With the foam in contact with the in-process fiber-reinforced layer precursor, and wetted by the fiber-reinforced layer precursor, the setting of the resin as the thermoplastic resin cools, or the reaction curing resin polymerizes, bonds the foam to the structural layers 34 and 36, and intercostals 50 as applies, whereby no separate adhesive is necessarily required to bond the foam to the respective structural elements.

Given a typical thickness of the main run wall section, of about 3 inches (7.6 cm), given that the cavities 196 are filled with light weight insulating foam, wall panels of the invention provide thermal insulation factors between layers 34, 36 of about R15. An additional e.g. R13 can be achieved by installing fiberglass insulation batts in cavities 131, thus to achieve an overall insulation factor of about R28 in typical walls of the invention, and achieving thermal insulation properties far superior to most concrete wall products, even insulated concrete wall products, currently available to the consuming public. Such superior insulation value can thus decrease heat loss to a substantially greater extent than most foundation wall products currently available to the consuming public.

Throughout this teaching, reference has been made to affixing various elements of the building panels to each other. In some cases, mechanical accessories such as bolts have been mentioned, such as for attaching the top plate to bracket 24 or 24A or 24B. In instances where two elements are affixed to each other, and where both elements contain resin components, especially reaction-cured components, the curing of the resin in any two such structural elements being formed or joined can be used to affix the elements to each other such that no further adhesive need be used. On the other hand, where components are assembled to each other at the construction site, at least in some instances, use of e.g. conventional construction adhesives and sealants which are known for utility in construction projects, is contemplated.

One example of use of construction adhesive in assembling the foundation wall is affixing the bottom plate to a wall panel. Wall panels of the invention can be transported to the construction site without top plate or bottom plate, and wherein top plate materials and bottom plate materials can be transported to the construction site separately, although potentially on the same vehicle. Bottom plates and top plates are then affixed to the wall panels at the construction site, as desired. The bottom plate is typically affixed to the bottom of the wall panel with a construction adhesive, with or without the assistance of brackets 24, and optionally bolts extending generally through the thickness of the wall panel between layers 234 and 236. The top plate can be affixed to the top of the wall panel using brackets 24 and bolts 139, and/or other support as needed, and optionally in addition, or in the alternative, adhesive between the top plate and the top of the wall panel.

Brackets 48, 160, and 170 can be adhesively mounted to the building panels. In the alternative, where the panels and brackets are made using curing resins, the surfaces of the respective parts, including the respective areas of the building panels, can be coated with a supply of the curing resin before the parts are assembled, and the parts can then be held together for a sufficient time, under known satisfactory conditions, which result in the curing of the resin, whereby the curing of the resin develops the necessary level of affixation between the respective parts of the wall.

In the same way, either adhesively or by use of curable resin materials, studs 123, support brackets 24, 48, and floor-andgarage apron brackets 188 can be mounted to a wall panel after the wall panel reaches the construction site.

It will be understood that any affixation of bracket 24 to the inner surface of the wall panel must be generally fully developed as to its required operating strength before the top plate or bottom plate, as applies, can be affixed to the wall panel and apply its rated load to bracket 24.

Figure 18:
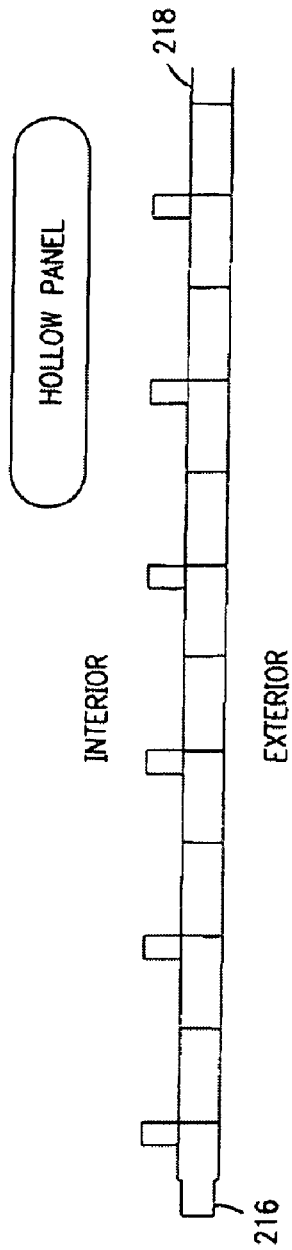
FIGS. 18 and 19 show plan view cross-sections of pultruded hollow panels and foam-filled panels of the invention.
Figure 19:
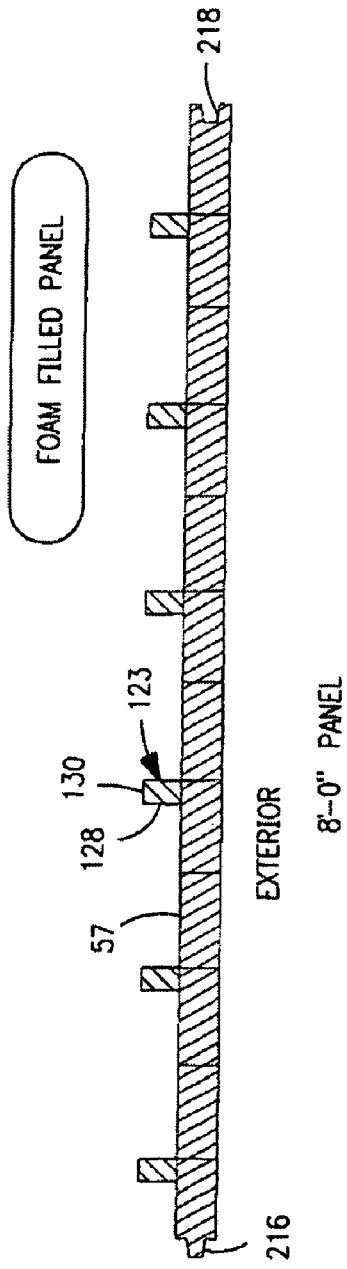

FIGS. 5, 17, 18, and 19 show cross-sections of building panels of the invention wherein inner layer 34, 234 and outer layer 36, 236, are integral with a structurally-reinforcing bridging intercostal web 250. Studs 123 extend from inner layer 34, 234 inwardly to end panels 130 of the respective studs. In the examples of FIGS. 18 and 19, one of the legs 128 on each of the studs is an extension of a respective intercostal web 250, whereby the intercostal and the stud leg function as in-line supports to each other, thus to form a unitary continuous support structure from outer layer 236 to end panel 130, and extending along the full height of the wall panel. Studs 123 create a cavity 131 (FIGS. 17-19) for running utilities or to add insulation.

Figure 20:
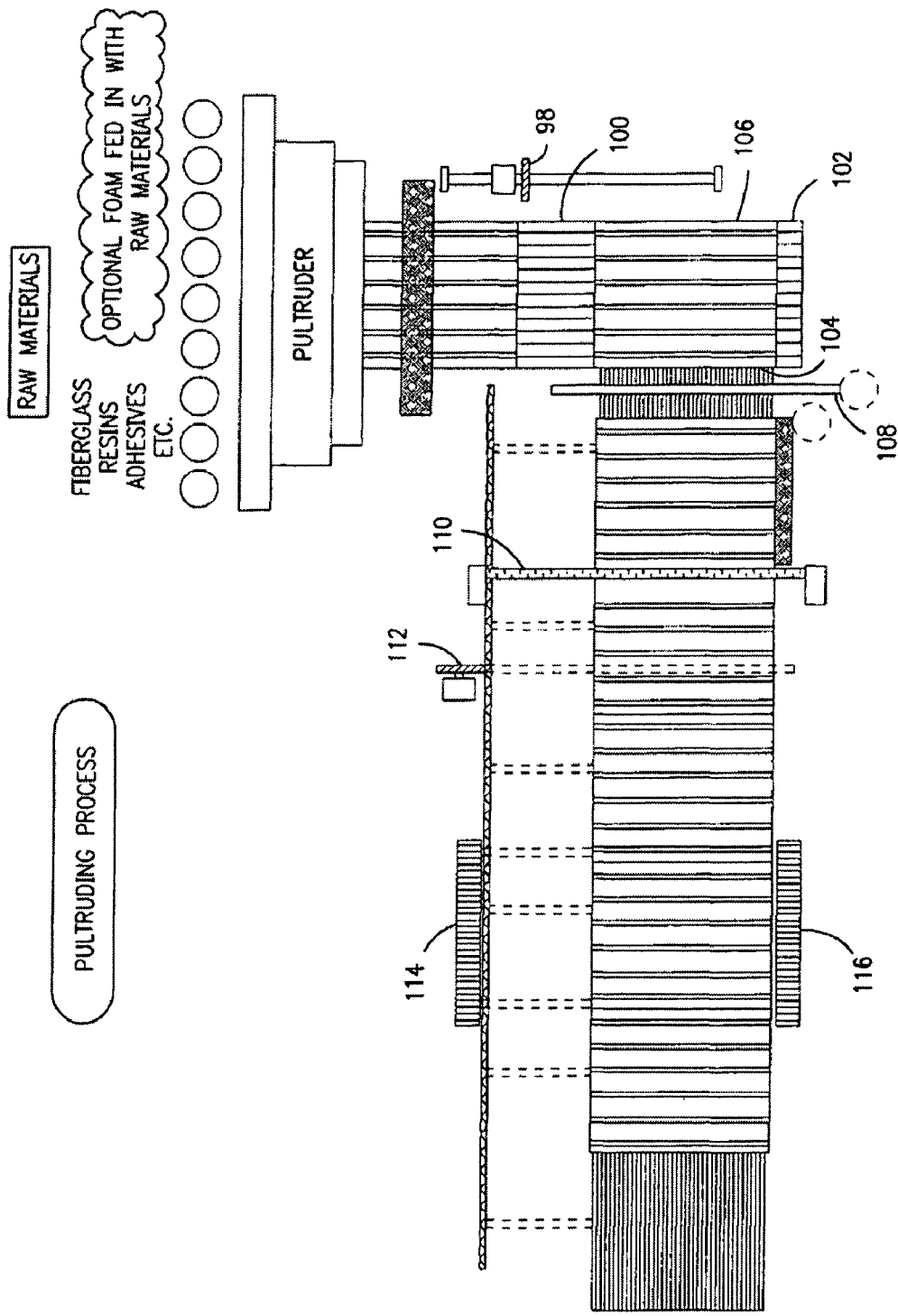
FIG. 20 is a representative plan view of an exemplary pultrusion and assembly process of the invention by which wall panels and wall sections can be fabricated to essentially any wall height and any wall length.

Building panels of the invention can be made by, for example, a continuous pultrusion process or a wet molding process. A pultrusion process is; illustrated in FIG. 20 wherein the cross-sections illustrated in FIGS. 5 and 17-19 are representative of the product coming out of the pultrusion die. The pultruded product is produced continuously by a pultruder 97. Pultruder 97 receives the scheduled fiberglass feeds, and resin feeds, optionally feeds of foam blocks 32, and forms and sets such materials in the designed configuration. The thus-formed and set pultruded product is cut by a traveling cut-off saw 98 at convenient lengths which represent the height of an upstanding building panel used in e.g. a wall structure.

Referring to FIGS. 18 and 19, the panel, as pultruded, has a generally continuous male side 216 and a generally continuous female side 218.

Referring back to FIG. 20, the so cut-off panel lengths traverse a conveyor 100 to a re-directing corner conveyor 102, where the cut-off panels execute a 90 degree turn while maintaining panel orientation, and depart the turn conveyor traveling with a leading side edge 104 and a trailing side edge 106. As each panel leaves the turning conveyor, the leading side edge and/or the trailing side edge of the panel is wetted with adhesive at work station 108 so that facing male and female side edges of adjacent panels can be adhesively joined together. The adjacent male and female side edges of adjacent panels are then pushed/urged together, thus joining the side edges of the adjoining panels to each other as illustrated in FIG. 5. Once the side edges are joined, a desired level of mechanical compression is applied at the joined side edges, thus to mechanically hold the side edge elements in conjoined relationship, e.g. at work station 110 long enough to obtain structural stability and longevity of the joinder relationship, e.g. until the adhesive material is cured.

Downstream from work station 110, a travelling cut-off saw 112 can be used to cut the so joined panels to any desired length.

Either before or after length cut-off saw 112, the top and/or bottom plates can be applied to the top and/or bottom of the panel at respective work stations 114, 116. In the alternative, the top and/or bottom plates can be applied to the top and/or bottom of one or more panels at the construction site.

The top and bottom cut ends are covered by top and bottom plates as desired, whether in the manufacturing process or prior to installation at the construction site.

Figure 16:
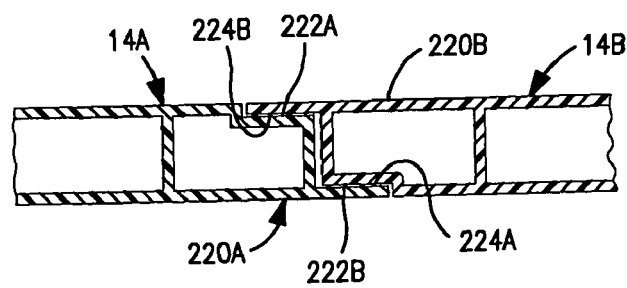
FIG. 16 shows a wall section illustrating plan view cross-sections of fragmentary portions of first and second upstanding building panels, illustrating a first set of edge structures in the two panels.

In embodiments where the closed cavities 196 in the pultruded structure are empty as in FIGS. 16 and 17, all of the strength in the structure is derived from structural elements 234, 236, and 250, and studs 123 when present. Thus, structural elements 234, 236, and 250, and studs 123, are designed as structural members in and of themselves. Thicknesses of layers 234 and 236, and intercostals 250, and studs 123, can be, for example and without limitation, about 0.04 inch (1 mm) to about 0.5 (12.7 mm) inch for building panels which are to be used for typical residential or light commercial or light industrial construction.

Cavities 196 can be used as utility runs as desired. In any of the pultruded structures, cavities 196 can be filled with insulating foam or other known insulating materials, as desired. Rigidity provided by such insulating material, if any, can be considered in designing especially the thicknesses of structural elements 234, 236, and 250, and the layers in studs 123. Foam can be incorporated into cavities 196 by feeding previously-formed elongate blocks 232 of foam into the pultrusion die along with the fiberglass and resin, whereby the resin flows about both the fiberglass and the foam, and bonds to both the foam and the fiberglass.

In some embodiments, the foam blocks are already wrapped with one or more layers of fiberglass before being fed into the pultrusion process. In other embodiments, all of the fiberglass is fed to the pultrusion process separate from the foam blocks.

In yet other embodiments, the foam is added into cavities 196 after the resin/fiber composition has been formed and set in the pultrusion process. In such instances, a foam-in-place process is used to inject a foamable material into cavities 196.

Exemplary structures of side edges of the pultruded building panels, and joinders of adjacent panels, are shown in FIGS. 5, 16, and 17. FIGS. 5, 18, and 19 show male-female end combinations on building panels 14. Each panel has a male edge 216 and a female edge 218. FIG. 16 shows end joinder structure where both ends 220 of a panel define a first step 222A, 222B and a second step 224A, 224B, each panel having the same end structure at both ends, and all panels having a common end structure. In FIG. 16, end 220A of panel 14A is joined with end 220B of panel 14B.

FIG. 17 shows first and second pultruded panels 14A, 14B, similar to the panels illustrated in FIGS. 5 and 16, including intercostals 250. In FIG. 17, each panel has a plain end 220A and a receiving end 220B. A reinforcing stud 123 is integral with the receiving end 220B. The plain end 220A of second panel 14B abuts against, and is joined to, the receiving end 220B of the first panel 14A in making a wall structure, ceiling structure, or floor structure; and inner layer 234 of the second panel 14B abuts, against and is joined to, the surface 226 of stud 123 on the adjacent panel 14A, surface 226 being that surface of the stud which faces outwardly in a constructed building when the panel is used in constructing a building outer wall.

Figure 13A:
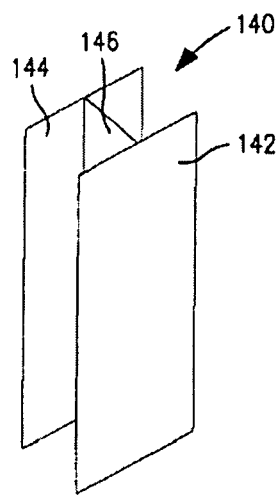
FIG. 13A is a pictorial line rendering of a resin-fiber composite "H" connector of the invention, which can be used to connect first and second wall panels in a straight line.
Figure 15A:
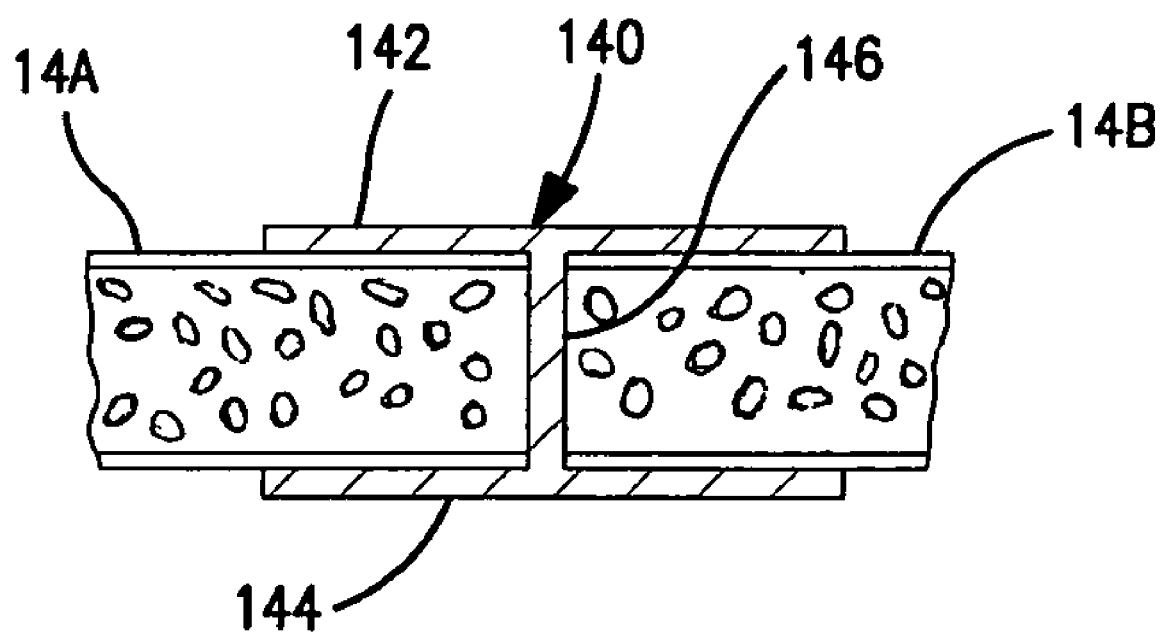
FIG. 15A is a plan view cross-section of a joint in a wall of the invention, joining first and second building panels of the invention using an "H" connector of FIG. 13A.

So long as the panels are not cut, the panels can be joined end-to-end using end structures which have been fabricated as part of the process of initially fabricating the panel. Where an initially-fabricated end structure of a panel is cut off, such as at the construction site, the cut-off end of that panel can be joined to another panel using e.g. an "H" bracket 140 (FIG. 13A) to make a straight-line joint such as that illustrated in FIG. 15A.

Referring to FIG. 17, the distance between the receiving edge and the plain edge represents the length of a panel 14. In panels which use studs 123, and where the panels are long enough, studs 123 are typically spaced at industry-standard distances from each other, parallel to each other, along the length of the panel. Thus, studs 123 are typically spaced every 16 inches (40.6 cm) or 24 inches (61 cm) along the length of the panel. Where other spacing distances are standard according to local practice, a corresponding stud spacing distance is contemplated.

The invention contemplates studs 123 structured as closed structures, such as a closed-perimeter rectangular tube, which may be assembled to a pultruded wall panel at desired spacings along the length of the wall panel. The invention further contemplates a stud 123 as a 3-sided rectangular e.g. pultruded structure, having opposing flanges on the open side of the tube, wherein such flanges extend away from each other and wherein the flanges provide mounting structure for mounting the stud to a wall panel e.g. at layer 34.

Studs 123 can be centered over a structurally-reinforcing intercostal member 50, 250, as in FIGS. 5 and 17, or offset from the structurally-reinforcing member, with one of the stud legs operating as an extension of the intercostal member, as illustrated in FIGS. 18 and 19. Further, studs 123 can be completely displaced from intercostals 250.

Figure 21:
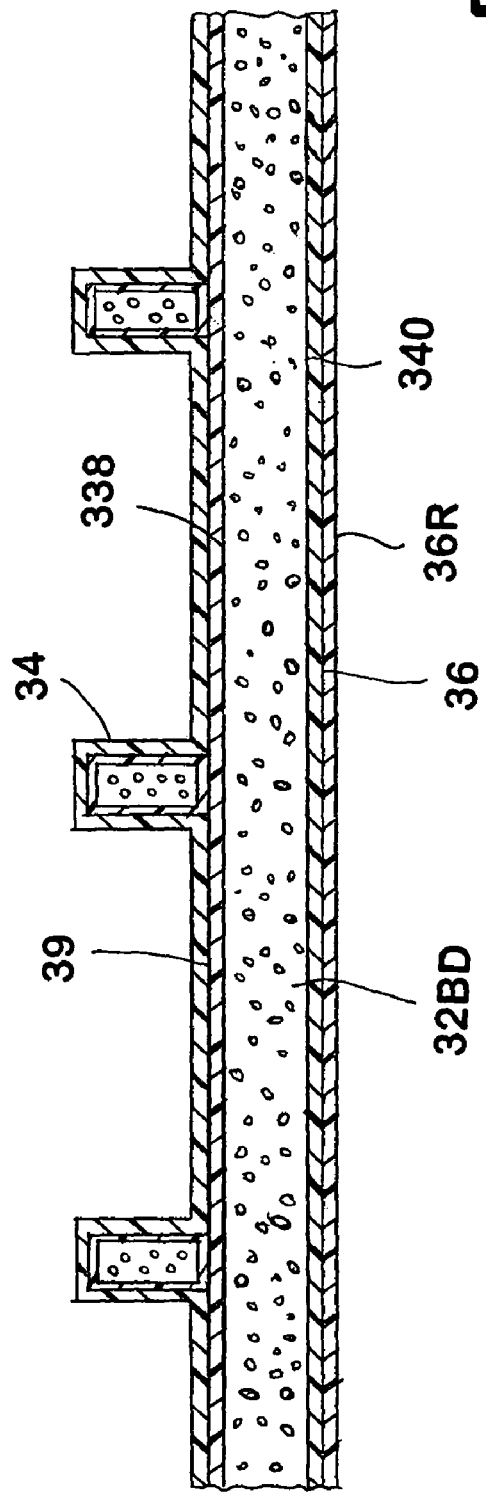
FIG. 21 is a representative plan view cross-section of a wall panel devoid of the structurally-reinforcing members between the inner and outer walls, wherein foam blocks pre-wrapped with fiberglass are assembled to a pre-fabricated panel.

FIG. 21 shows a wall panel having no intercostal reinforcements, namely no intercostals 50, 250, and no other reinforcement between the inner and outer layers. FIG. 21 does show an intermediate layer 39 between studs 123 and a foam board 32BD. Foam board 32BD is generally continuous along the full height and width of the wall panel, and across the full thickness of the wall panel between intermediate layer 39 and outer layer 36. Specifications for the foam board 32BD, including polymer content, density, rigidity, and the like, are the same as for foam blocks 32. Specifications for intermediate layer 39, including fiber content, polymer content, polymer selection, layer thickness, and method of making the layer are generally the same as for layer 34, namely layer 39 can be made by the pultrusion process as part of the process of making the remaining elements of the panel.

FIG. 21 also shows a reinforcing layer 36R disposed outwardly of outer layer 36 such that outer layer 36 is between reinforcing layer 36R and the foam board 32BD. The specifications for layer 36R in the embodiments of FIG. 21, including fiber content, polymer content, polymer selection, layer thickness, and method of making the layer are the same as for layer 36, namely layer 36R can be made by the pultrusion process as part of the process of making the remaining elements of the panel.

Figure 22:
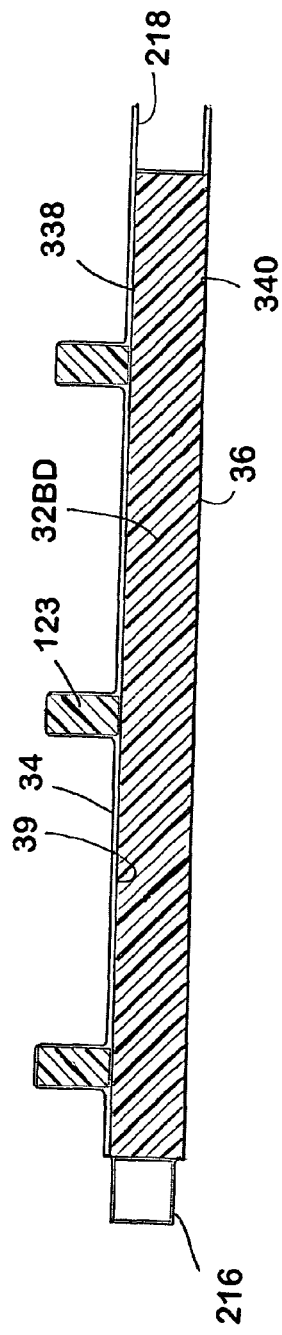
FIG. 22 is a representative plan view cross-section of a wall panel having studs but no structurally-reinforcing members.
Figure 23:
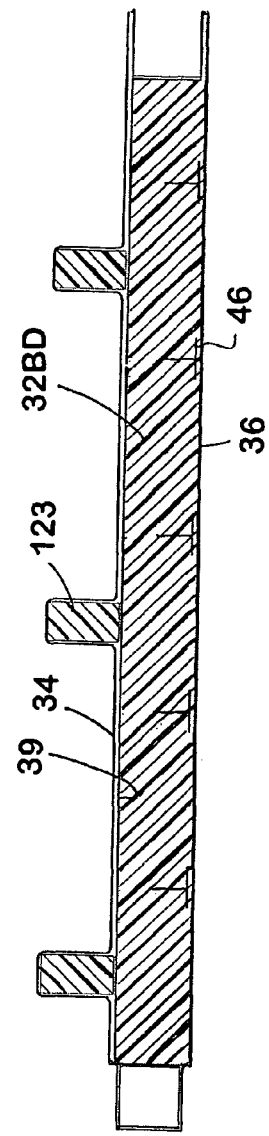
FIG. 23 is a representative plan view cross-section as in FIG. 22 but with upwardly-oriented T-shaped reinforcements.

Layers 36R and 39 are optional. FIG. 22 illustrates an embodiment where layer 39 is retained but layer 36R has been omitted. In FIGS. 22, and 23, the respective layers are represented by single lines. The structure of FIG. 22 includes foam board 32BD, outer layer 36 on an outer surface of board 32BD, intermediate layer 39 on an inner surface of board 32BD, inner layer 34 overlying intermediate layer 39, and studs 123 between intermediate layer 39 and inner layer 34. Layer 39 can be omitted such that studs 123 lie directly against foam board 32BD. FIG. 22 further illustrates an alternate configuration for male 216 and female 218 ends on the panel.

FIG. 22 illustrates spacing of the studs 16 inches (40.6 cm) apart, with corresponding spacing of the male and female ends so as to accommodate common construction protocol which spaces studs 16 inches (40.6 cm) apart along the length of the wall for purposes of interfacing such studs with commonly available construction materials.

The embodiments illustrated in FIG. 23 are similar to those illustrated in FIG. 22, including intermediate layer 39, with the addition of reinforcing "T's" 46 adjacent outer layer 36. While "T's" 46 can be made from a variety of stiff, rigid materials, FRP materials, similar in rigidity to layers 34, 36 are contemplated. In general, "T's" 46 are affixed to outer layer 36 so as to absorb and bear especially external stresses imposed on the wall panel at outer layer 36, thus to direct such stresses away from outer layer 36 and internally into the interior of the wall panel.

Wall panels of FIGS. 21, 22, and 23 are conveniently made in pultrusion processes wherein the foam board is fed into the pultrusion processing equipment whereupon the respective resin is applied to the foam board, resulting in inherent bonding of the resin to the foam board as the resin cures about the board. Suitable reinforcing fiberglass structure can be simultaneously fed into the pultrusion process, thus to collectively position the foam, the resin, and the fiberglass relative to each other, and to bond the foam, the resin, and the fiberglass to each other, during the pultrusion process.

In some embodiments, fiberglass layers are mounted to the foam board before the foam board is fed into the pultrusion process.

Where reinforcing "T"'s 46 are used, grooves are optionally formed in the foam board, and the "T"'s are mounted in the foam board, before the foam board is fed to the pultrusion process. Construction adhesive may be used to temporarily or permanently hold the reinforcing "T"'s in the foam board prior to feeding the foam board to the pultrusion process. In any event, the curing of the resin about the foam board, and flow of the resin into the "T" grooves, results in the foam board being solidly mounted in the panel, and "T"'s being solidly incorporated into the resulting structure.

Wall panels without studs 123, as in FIGS. 21, 22, and 23, find particular use in some above-grade applications, where strength requirements are less demanding. Such wall panels without studs also find use in above-grade applications where thermal insulation requirements are more demanding than in foundation walls, and/or where utility cavities 131 are relatively less valuable, which means that a greater overall insulation value can be built into the wall panel as pultruded, by providing a wall panel wherein the main run wall section is thick enough (dimension "T") to provide a uniform thermal resistance along the full length and height of the wall.

Figure 24:
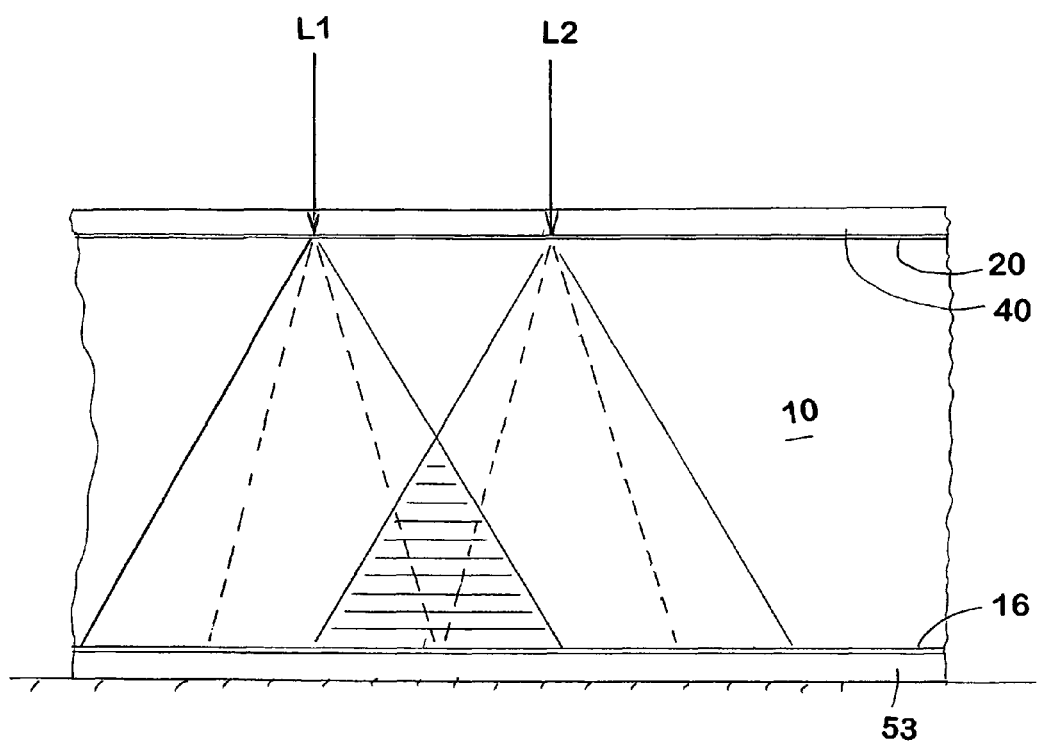
FIG. 24 is an elevation view, from outside a building, of a section of a wall, generically illustrating relative load distribution for an exemplary concrete wall section, and for a corresponding exemplary wall section of the invention.

FIG. 24 shows an elevation view of a portion of a wall of the invention, including a footer 53 on an underlying natural base, a bottom plate 16, a wall 10 of the invention, top plate 20, and overlying floor 40. Loads "L1" and "L2" are shown spaced from each other and applying downwardly directed forces on the wall. Loads "L1" and "L2" represent building loads generated by overlying building structure. Loads "L1" and "L2" are intended to represent loads of differing magnitude spaced along the length of the wall, as representations that loads of different magnitude are typically imposed on a building outside wall at different locations along the length of the wall.

Under each of the loads "L1" and "L2" in FIG. 24, a first cone defining a first relatively narrower angle is defined by dashed lines, and a second cone defining a second relatively greater angle is defined by solid lines. The relatively narrower and greater angles of the cones under each load are intended to generically represent the relative difference between load distribution in a concrete wall (narrower angle) and load distribution in walls of the invention (greater angle). Thus, FIG. 24 illustrates a substantial functional difference between walls of the invention and conventional concrete walls. Namely, relatively speaking, concrete walls tend to distribute the load over a relatively smaller area while walls of the invention tend to distribute the load over a relatively greater area. The area shaded with horizontal lines represents a length portion of the wall where the loads "L1" and "L2" are both supported in part by the bottom portion of a wall of the invention while a concrete wall has no such load sharing function with respect to loads "L1" and "L2".

In light of the relative load sharing features of concrete walls and walls of the invention, for a given building structure, the building load from that portion of the building which overlies the foundation wall, delivered through the foundation wall to the footer by a wall of the invention, designed to carry such load, has a load variation along the length of the footer, which is substantially less than the load variation delivered through a corresponding concrete foundation wall which is designed to carry such building overlying load. And in general, the load delivered to the footer generally varies by less than about 50 percent, typically by less than 25 percent, along any one 10 foot length of the footer.

No dimensions are given in FIG. 24, either dimensions of the wall or cone angle magnitudes, because the performance of a specific wall depends on the exact specifications of that wall. Thus, FIG. 24 shows the general tendencies of walls of the invention for a given building structure relative to concrete walls designed to handle a similar building structure.

Another advantage of wall structures of the invention is that, for a given footer design, wall structures of the invention can carry greater overlying loads, on the foundation wall, than concrete foundation walls.

For example, consider a standard concrete wall 8 inches (20.3 cm) thick and 9 feet (2.7 meters) high, which weighs about 1000 lbs per lineal foot (1488 kg per lineal meter), overlying a 2-foot (0.6 meter) wide footer, where soil load capacity is 3000 lbs per square foot (14,637 kg per square meter), Given the 2-foot (0.6 meter) wide footer, load capacity of the soil is 6000 lbs per lineal foot (8925 kg per linear meter). Since the concrete wall weighs 1000 pounds per lineal foot (1488 kg per lineal meter), the overlying building structure is limited to no more than 5000 pounds per lineal foot (7438 kg per lineal meter).

By contrast, using the same parameters, but replacing the concrete wall at 1000 pounds per lineal foot (1488 kg per lineal meter) with wall structure of the invention, which is about 25-60 pounds per lineal foot (37-89 kg per lineal meter), the overlying building structure can exert as much as at least 5911 pounds per lineal foot (8793 kg per lineal meter), an 18% increase in the amount of the load bearing capacity of the soil which can be derived from the building structure which overlies the foundation wall.

Yet another advantage of walls of the invention is the fact that variation in the finished height of a foundation wall can be controlled more closely in walls of the invention than can the finished height of a foundation wall be controlled where the wall is constructed on site from poured ready-mix concrete or concrete block walls. Namely, even using highly skilled masons, a variation in height of a finished concrete wall of 0.5 inch (12.7 mm) to 1.0 inch (25.4 mm) is quite common. Such variations can be attributed at least in part by the fact that ready-mix forms are set by hand. Whatever the cause of such variations, such is the experience in the industry.

Such variation generally transfers to overlying portions/floors of the building structure, resulting in unintended structural dimension variations and load distribution variations.

By contrast, because wall panels and walls of the invention are by definition fabricated, at least as to height, in a fixed-location manufacturing facility, the height variation can be substantially attenuated, thus substantially attenuating such unintended structural dimension variations and load distribution variations. Overall, wall panels of the invention, when installed in buildings, can have height variations over a 40 foot (12.2 meter) length of the wall panel of less than 0.5 inch (12.7 mm), optionally no more than 0.25 inch (6.3 mm), optionally less than 0.13 inch (3.3 mm), and typically no more than about 0.063 inch (1.6 mm).

Among the requirements of the wall structure member is that the materials in the wall structure cannot be sensitive to, susceptible to substantial degradation by, water or any inclusions commonly found in water, whether dissolved minerals or organic materials such as life forms which live on or transform the compositions of the fibers. Namely, the materials cannot be susceptible to degradation by water or anything in water, to the extent such degradation jeopardizes the ability of the structure made from such building panels, to provide the compressive strength necessary to support the overlying building loads, and the bending loads imposed by subterranean forces, and above-grade external forces.

Accordingly, the wall elements typically do not include uncoated corrugated wood fiber structures commonly referred to as corrugated cardboard structures, or any other fibers whose strengths are substantially affected by moisture or moisture vapor. Nor do the wall elements typically include any inclusions which are substantially affected by materials which can be expected to exist in moisture found in or around the soil adjacent a building structure. Further, fibers or other inclusions cannot be susceptible to insect infestation, or any other degrading factors. Thus, fibers or other inclusions are generally inorganic materials which are not deleteriously affected, namely whose useful properties are not severely degraded, by the environment in which the wall panels are used, over the expected use life of such wall panels; which use life generally conforms to local industry standards.

While a pultrusion process has been described herein for making wall panels of the invention, panels 14 can be made by other known fabrication processes such as wet bag processes, and optionally bag infusion processes. Wet bag processes are especially beneficial with certain ones of the panel configurations.

In any of the embodiments of the invention, one or more gel coats can be applied to the panel structure at one or both of the inner and outer surfaces.

Whatever the materials used for the reinforcing fiber, the foam, the resin, all of such elements, including UV inhibitors, fire retardant, any fillers, any intumescent material, any smoke toxicity suppressant, any smoke generation suppressant, any wetting agent, any fluidity enhancers, or any other additives, are chemically and physically compatible with all other elements with which they will be in contact, such that no deleterious chemical or physical reaction takes place between cooperating materials which are used in fabricating wall systems of the invention.

One of the substantial benefits of wall structures made using the teachings of the invention is that the wall structures are water-proof and moisture proof. For example, in areas where hurricanes are frequent, building codes require concrete structure in above-grade housing walls. Experience has shown that hurricane-force winds drive rain forcefully through such concrete wall structures so as to cause substantial water damage even when the building structure, itself, is not damaged.

By contrast, wall structures of the invention are essentially water proof; and such water proof characteristic is not affected by hurricane-driven rain. Outer layer 36, 236 is, itself, water proof. While layer 36, 236 is quite tough for water to penetrate, even if outer layer 36, 236 is breached, the foam 32 is water proof in that the individual cells of the foam 32 are typically closed cells. If the foam layer is also breached, inner layer 34 is also water proof. In any event, any breaching force has to penetrate multiple waterproof layers, at least two of which are substantially tough layers when considered in light of the types of forces which are typically imposed on buildings by weather or other typical outside loads. The structures which do not include foam are substantially similarly-effective barriers to water penetration.

Regarding the joint between the bottom of the wall panel and the bottom plate, such joint can be filled with curable resin as discussed earlier herein, with adhesive, with caulk, or with other barrier material, thus to block any penetration of water at the joint between the wall panel and the bottom plate.

Similarly, vertical joints in the foundation wall can be closed to water penetration by applying curable resin, adhesive, caulk, or other water-proofing coatings to the joint, as well as using "H" brackets 140. In addition, as mentioned elsewhere herein, adhesives, resins, and the like can be applied to the building panels and/or to the various brackets before the brackets are applied to the respective building panels, thereby to provide further water-proofing characteristics to the finished foundation wall, or above-grade wall.

Building panels of the invention find use in various residential, light commercial and industrial construction applications. The strength and other specifications of a given wall panel is specified in accord with the loads to be imposed during the anticipated use life of the building.

Wall structures of the invention find application in and as, for example and without limitation, the construction of foundation walls; frost walls e.g. in buildings which have no basement; manufactured home base curtain walls; floor systems; ceiling systems, roof systems; exterior above-grade walls; curtain walls as in high rise construction replacing concrete block; and exterior walls in areas that use masonry exteriors, such as in coastal construction. While the specification and drawings have focused on foundation walls, the principles disclosed herein apply in the same way to other uses of panels and accessories of the invention.

A variety of accessories and parts can be used with projects which use walls of the invention, for example and without limitation, posts to support beams/girders, fiber-reinforced piers which optionally include structural top and bottom, post pads, inside corner brackets, outside corner brackets, "H" channel brackets, top plate connectors, garage floor shelves, support brackets, floor-and-garage apron brackets, service door cut outs, garage door cut outs, frost wall transitions, and stud profiles.

In addition, there can be mentioned fiber and resin patch kits suitable for use to patch a damaged building panel, angled wall connectors, full basement wall to garage transition, frost wall returns, attachment of top and bottom plates, along with potential shipping advantages where the top and bottom plates and/or other elements are affixed at the construction site, beam pockets, post pads in the footer to distribute load, and window bucks. There can also be mentioned fasteners to apply exterior product and to provide connections to other parts of the building. Such fasteners can be, for example and without limitation, metal or fiber-reinforced polymer composite. A wide variety of accessories can be affixed to the wall structure using conventionally available adhesives and/or mechanical fasteners such as screws and bolts, for field applications.

A specific advantage of wall systems of the invention is that such wall systems can be readily sized and configured for use with already-available standard size conventional building products, e.g. construction materials.

Building panels of the invention can be cut, using conventional tools commonly available at a construction site, to fit the needs of the job at hand. For example, a panel can be cut for length. A window opening can be cut out. A door opening can be cut out. Utility perforations of the foundation wall can be cut, such as for furnace fresh air intake or combustion gas exhaust, or the like, or such utilities can be run in cavities 131 between studs 123 and inwardly of inner layer 34.

Advantages of the invention include, without limitation, a composite bottom plate which has potential to provide a wider footprint to the underlying soil than the projected area of the wall panel, for distributing the overlying weight of the building. The bottom plate can be applied on site or off site. The wall structures of the invention are light weight compared to the concrete structures they replace. The wall structures of the invention are waterproof, versatile, mold resistant, termite resistant, and rot resistant. The substantial polymeric component of the compositions of wall structures of the invention provides a desired level of radon barrier in accord with existing building codes whereby the conventionally-used polymeric layer on the outside of the foundation wall is not needed, and can be omitted, along with corresponding savings in material and labor costs.

Typical wall structures of the invention can be installed with only minimal equipment, or manual labor, and do not require bringing any large machines to the construction site for the purpose of installing a footer, a foundation wall, or an above-grade wall, no ready-mix truck, no form truck, and only a light-duty crane to install the building panels.

The invention does contemplate larger wall panels, e.g. thicker, taller, and/or longer, which can weigh at least 200-800 pounds (363-907 kg) or more. Further, where a wall or roof panel is being erected above the ground floor, a suitable-weight light-duty crane, such as for lifting e.g. up to about 3500 pounds (1587 kg) facilitates such greater-height installation.

Wall structures of the invention can be installed in all seasons and all weather, so long as the excavation can be dug to a suitable natural support base. Panels of the invention are environmentally friendly. Panels of the invention are consistent with the requirements to qualify as Green buildings and/or as Energy Star buildings whereby buildings built with building panels of the invention may qualify for such ratings. No damp proofing is needed. Once the foundation walls are in place, the interior of the so-enclosed space is ready to be finished. HVAC cavities are available between studs 123 as e.g. in spacings 131. Plumbing and electric can also be run through the walls easily because the walls are easily drilled or cut at the construction site, again between studs 123, optionally inside studs 123.

The building panels can be repaired more readily than concrete. Openings can be cut more easily than concrete. Wall changes can be made more easily than concrete. Any typical wall height can be achieved with a facile cutting process. The building panels can be installed on an aggregate stone footer, whereby no pouring of a concrete footer is required. Thus, the lowest level wall of the building can be completed with no need for any ready-mix concrete at the construction site.

Wall structures of the invention have multiple desirable properties, including being fire resistant where fire retardant ingredients are included in the resin formulation, or when intumescent material is used in layer 34, being a good barrier to ultraviolet rays, providing good sound attenuation, being generally free from insect infestation, being generally not susceptible to infestation by rot-generating organisms, being a good barrier to water, including being a good barrier to driven rain, and being a good barrier to transmission of radon gas.

Wall structures of the invention are sturdy, durable, and have very favorable expansion and contraction ratings compared to the concrete they replace. The wall structures tolerate a wide range of temperatures such as are encountered in building construction. The building panels of the invention are easy to transport to the construction site. The building panels can be mass-produced and do not have to be project-specific like known e.g. insulated wall systems which are produced off-site, and transported to the construction site as pre-fabricated wall systems. Wall, ceiling, roof, and floor structures of the invention can be installed in locations where it is difficult to get delivery of ready-mix concrete, such as on islands, in weight restricted areas, in high-rise curtain walls, and the like.

Although the invention has been described with respect to various embodiments, it should be realized this invention is also capable of a wide variety of further and other embodiments within the spirit and scope of the appended claims. Thus, wall panels and walls of the invention can be used for a variety of implementations, which may suggest thicker walls, or stronger walls, in order to achieve performance requirements of the walls. Other implementations may suggest thinner walls, or weaker walls, for cost-effectiveness. Such walls may or may not include studs 123, intercostals 50, 250, or "T's" 46. In light of the invention as disclosed herein, those skilled in the construction arts are now enabled to design such walls according to the needs of their particular building projects. All such other implementations are contemplated herein.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A fiber-reinforced polymeric building panel, said building panel having a height extending between a top and a bottom of said building panel, a length, and a thickness, all defined when said building panel is in an upright orientation, said building panel comprising:
   (a) a first outer fiber-reinforced polymeric layer defining a first outermost surface of said building panel;
   (b) a second inner fiber-reinforced polymeric layer defining a second outermost surface of said building panel and being spaced from said first layer by a first distance;
   (c) one or more reinforcing webs, spaced from each other, and extending from said first layer to said second layer, each said reinforcing web having a web length defined along the height of said building panel, and a web width defined along the thickness of said building panel, a given said reinforcing web lying in a first imaginary plane; and
   (d) a plurality of fiber-reinforced polymeric studs spaced from each other along the length of said building panel and extending along the height of said building panel, each said stud comprising first and second legs (128) extending away from the second outermost surface,
   a said one of said stud legs (128) having a width defined along the thickness of said building panel and a length aligned with the height of said building panel, said one stud leg lying in a second
   imaginary plane coincident with the first imaginary plane.

2. A fiber-reinforced polymeric building panel as in claim 1, deflection of said building panel under rated load being limited to no more than $$\text{Deflection} = L/240,$$

where L is the top-to-bottom height of said building panel, and deflection and "L" are expressed in a common unit of measure.

3. A fiber-reinforced polymeric building panel as in claim 1, said studs extending inwardly from the second outermost surface, and away from the first outermost surface, a distance greater than the first distance.

4. A fiber-reinforced polymeric building panel as in claim 1, said studs being spaced from each other by at least 16 inches, said studs extending from the second outermost surface along said first and second legs a distance of about 3.5 inches to said end panels, said stud legs and said end panels each being about 0.09 inch thick, said inner layer, said outer layer, and said reinforcing webs each being about 0.09 inch thick, said building panel, when disposed in an upright orientation and subjected to a downwardly-directed load applied at the top of said building panel, and evenly distributed between said outer layer and said end panels, having a vertical crush strength of at least 5,000 pounds per linear foot of the length of said building panel, and deflecting, between the top and bottom of the building panel, toward said outer layer.

5. A fiber-reinforced polymeric building panel, said building panel having a height extending between a top and a bottom of said building panel, a length, and a thickness, said building panel comprising:
   (a) a first outer fiber-reinforced polymeric layer defining a first outermost surface of said building panel, and comprising at least a first uprightly oriented layer of unidirectional fiberglass, and a surface veil, collectively in combination with a resin composition; and
   (b) a second inner fiber-reinforced polymeric layer spaced from said first layer by a first distance, said inner layer defining a second outermost surface of said building panel and comprising at least a second uprightly oriented layer of unidirectional fiberglass, and an intumescent veil, collectively in combination with said resin composition.

6. A building panel as in claim 5, further comprising a plurality of reinforcing webs, spaced from each other, and extending from said first fiber-reinforced polymeric layer to said second fiber-reinforced polymeric layer, said reinforcing webs comprising fiberglass arranged between said inner and outer layers, collectively in combination with said resin composition, said first and second fiber-reinforced structural polymeric layers, in combination with said reinforcing webs, defining spaces therebetween at each occurrence of the respective reinforcing webs.

7. A fiber-reinforced polymeric building panel as in claim 6, further comprising blocks of foam filling the spaces between the reinforcing webs and the inner and outer layers.

8. A fiber-reinforced polymeric building panel as in claim 7 wherein the blocks of foam are integrally connected with the combination of fiberglass layers and resin composition in the inner and outer layers.

9. A building panel as in claim 6, further comprising a plurality of reinforcing fiber-reinforced polymeric studs spaced from each other along the length of said building panel, each said stud comprising first and second legs (128) extending from the second outermost surface, away from the first outermost surface, to an end panel (130), said at least second layer of uprightly oriented unidirectional fiberglass extending about said studs at said legs and said end panels, a third layer of fiberglass being disposed inwardly in each of said studs from said second layer of uprightly oriented unidirectional fiberglass rovings, in combination with said resin composition.

10. A fiber-reinforced polymeric building panel as in claim 9, a said one of said legs (128) being aligned with one of said reinforcing webs such that a straight line parallel to the respective said stud leg can extend through both the respective said stud leg and through the respective said reinforcing web.

11. A building panel as in claim 5, further comprising a plurality of reinforcing fiber-reinforced polymeric studs spaced from each other along the length of said building panel, each said stud comprising first and second legs (128) extending from the second outermost surface, away from the first outermost surface, to an end panel (130), said at least second layer of uprightly oriented unidirectional fiberglass extending about said studs at said legs and said end panels, a third layer of fiberglass being disposed inwardly in each of said studs from said second layer of uprightly oriented unidirectional fiberglass rovings, in combination with said resin composition.

12. A fiber-reinforced polymeric building panel as in claim 11 wherein each of said first, second, and third layers of fiberglass comprises a layer of fiberglass rovings and is accompanied by an adjacent chopped strand mat layer.

13. A fiber-reinforced polymeric building panel as in claim 12 wherein the chopped strand mat layers accompanying each of the first and second layers of fiberglass rovings are between the respective rovings and the surface veil, and wherein the chopped strand mat layers accompanying the third layer of fiberglass rovings is between the respective rovings and the intumescent veil.

14. A fiber-reinforced polymeric building panel, said building panel having a height extending between a top and a bottom of said building panel, a length, and a thickness, said building panel comprising:
   (a) a first outer fiber-reinforced polymeric layer defining a first outermost surface of said building panel, and comprising at least a first layer of fiberglass, in combination with a resin composition;
   (b) a second inner fiber-reinforced polymeric layer spaced from said first layer, said inner layer defining a second outermost surface of said building panel and comprising at least a second layer of fiberglass in combination with the resin;
   (c) a plurality of reinforcing webs, spaced from each other, and extending from said first fiber-reinforced polymeric layer to said second fiber-reinforced polymeric layer,
   a building panel body being defined between said inner layer and said outer layer, including said reinforcing webs, and excluding said inner layer and said outer layer; and
   (d) a plurality of fiber-reinforced polymeric studs spaced from each other along the length of said building panel, each said stud comprising a stud core (232A), said stud core having a core outer surface facing away from said outer layer, a core inner surface facing toward said outer layer, and first and second core side surfaces extending between the core inner surface and the core outer surface, each said stud further comprising first and second stud legs (128) extending alongside the core side surfaces, and an end panel (130) extending alongside the core outer surface, said inner layer, comprising both said second layer of fiberglass and said resin, traversing alongside said building panel body from a first said stud to a second said stud, then departing said building panel body and extending about said second stud as at least a part of said first stud leg, as at least a part of said stud end panel, and as at least a part of said second stud leg, such that said second layer of fiberglass extends about only three sides of said stud core.

15. A fiber-reinforced polymeric building panel as in claim 14, further comprising a third layer of fiberglass extending, from a first end thereof adjacent said building panel body and a first side surface of a said stud core, alongside a said first such side surface and toward the respective core outer surface, alongside the core outer surface, and alongside the second side surface and back toward said building panel body to a second end thereof adjacent said building panel body.

16. A fiber-reinforced polymeric building panel as in claim 15 wherein said third layer of fiberglass is disposed between said stud core (232A) and said second fiberglass layer, on said stud.

* * * * *

UNITED STATES PATENT AND TRADEMARK OFFICE
CERTIFICATE OF CORRECTION

| | | |
|---|---|---|
| PATENT NO. | : 8,272,190 B2 | Page 1 of 1 |
| APPLICATION NO. | : 12/317164 | |
| DATED | : September 25, 2012 | |
| INVENTOR(S) | : Gerhard P. Schiffmann et al. | |

It is certified that error appears in the above-identified patent and that said Letters Patent is hereby corrected as shown below:

In column 17, line 66 of the granted patent, remove "meter). The" between "The" and "distance/depth".

In column 20, line 36 of the granted patent, replace "secures" with --secure--.

In column 31, line 23 of the granted patent, remove the ";" after "A pultrusion process is".

Signed and Sealed this
First Day of January, 2013

David J. Kappos
*Director of the United States Patent and Trademark Office*